(12) United States Patent
Landa et al.

(10) Patent No.: US 10,981,191 B2
(45) Date of Patent: Apr. 20, 2021

(54) METAL PRINTED CONSTRUCTIONS

(71) Applicant: ACTEGA Metal Print GmbH, Lehrte (DE)

(72) Inventors: Benzion Landa, Nes Ziona (IL); Sagi Abramovich, Ra'anana (IL); Anton Krassilnikov, Durham, NH (US); Tamar Asher, Tel Aviv (IL)

(73) Assignee: ACTEGA METAL PRINT GMBH, Wesel (DE)

( * ) Notice: Subject to any disclaimer, the term of this patent is extended or adjusted under 35 U.S.C. 154(b) by 65 days.

(21) Appl. No.: 15/577,262

(22) PCT Filed: May 27, 2016

(86) PCT No.: PCT/IB2016/053154
§ 371 (c)(1),
(2) Date: Nov. 27, 2017

(87) PCT Pub. No.: WO2016/189519
PCT Pub. Date: Dec. 1, 2016

(65) Prior Publication Data
US 2018/0147871 A1 May 31, 2018

(30) Foreign Application Priority Data

May 27, 2015 (GB) ..................................... 1509080
Aug. 17, 2015 (GB) ..................................... 1514618
(Continued)

(51) Int. Cl.
*C09D 1/00* (2006.01)
*C09D 5/38* (2006.01)
(Continued)

(52) U.S. Cl.
CPC ............ *B05C 19/06* (2013.01); *B05B 7/1481* (2013.01); *B05B 9/00* (2013.01); *B05B 9/01* (2013.01);
(Continued)

(58) Field of Classification Search
CPC ..... B05C 19/06; B05C 1/0808; B05C 1/0817; B05C 11/023; B05C 1/00; B05B 9/01;
(Continued)

(56) References Cited

U.S. PATENT DOCUMENTS 1,905,959 A   4/1933 Cutler
3,127,668 A   4/1964 Troy
(Continued)

FOREIGN PATENT DOCUMENTS

CA   2520442 A1   3/2007
CN   101337469    1/2009
(Continued)

OTHER PUBLICATIONS

PCT; PCT App. No. PCT/IB2016/053154; International Search Report and Written Opinion dated Oct. 11, 2016.
(Continued)

*Primary Examiner* — Nathan L Van Sell
(74) *Attorney, Agent, or Firm* — Fitch, Even, Tabin & Flannery, L.L.P.

(57) ABSTRACT

There is disclosed a print construction comprising: (a) a printing substrate having an image-receiving surface; (b) a receptive layer, at least partially covering said image-receiving surface, and having a particle reception surface distally disposed to said image-receiving surface, said receptive layer optionally having a thickness of at least 1000 nanometer (nm); and (c) a plurality of individual particles
(Continued)

adhered to said particle reception surface, and forming a monolayer thereon, the features of which are described herein.

43 Claims, 9 Drawing Sheets

(30) Foreign Application Priority Data

| Aug. 17, 2015 | (GB) | 1514619 |
|---|---|---|
| Mar. 8, 2016 | (GB) | 1603997 |
| Mar. 23, 2016 | (GB) | 1604989 |

(51) Int. Cl.

| B05C 19/06 | (2006.01) |
|---|---|
| B41J 2/005 | (2006.01) |
| B41C 1/18 | (2006.01) |
| B41F 19/00 | (2006.01) |
| B41M 3/00 | (2006.01) |
| B41M 5/00 | (2006.01) |
| B41M 1/00 | (2006.01) |
| B05D 1/00 | (2006.01) |
| B41F 31/18 | (2006.01) |
| B05B 9/00 | (2006.01) |
| B05C 1/00 | (2006.01) |
| B05C 11/02 | (2006.01) |
| B05D 1/12 | (2006.01) |
| B05D 1/28 | (2006.01) |
| B05D 3/00 | (2006.01) |
| B05B 7/14 | (2006.01) |
| B05C 1/08 | (2006.01) |
| B05D 3/12 | (2006.01) |
| C23C 24/04 | (2006.01) |
| B44F 9/10 | (2006.01) |
| B41M 1/22 | (2006.01) |
| B05B 9/01 | (2006.01) |
| B41M 1/04 | (2006.01) |
| B44C 1/24 | (2006.01) |
| B44C 1/28 | (2006.01) |
| B41J 11/00 | (2006.01) |
| B41C 1/10 | (2006.01) |

(52) U.S. Cl.
CPC .............. *B05C 1/00* (2013.01); *B05C 1/0808* (2013.01); *B05C 1/0817* (2013.01); *B05C 11/023* (2013.01); *B05D 1/00* (2013.01); *B05D 1/12* (2013.01); *B05D 1/28* (2013.01); *B05D 3/007* (2013.01); *B05D 3/12* (2013.01); *B41C 1/184* (2013.01); *B41F 19/001* (2013.01); *B41F 19/002* (2013.01); *B41F 19/005* (2013.01); *B41F 31/18* (2013.01); *B41J 2/0057* (2013.01); *B41M 1/00* (2013.01); *B41M 1/04* (2013.01); *B41M 1/22* (2013.01); *B41M 3/00* (2013.01); *B41M 3/001* (2013.01); *B41M 5/00* (2013.01); *B41M 5/0017* (2013.01); *B44C 1/24* (2013.01); *B44C 1/28* (2013.01); *B44F 9/10* (2013.01); *C09D 1/00* (2013.01); *C09D 5/38* (2013.01); *C23C 24/04* (2013.01); *B41C 1/1091* (2013.01); *B41J 11/0015* (2013.01)

(58) Field of Classification Search
CPC ........... B05B 7/1481; B05B 9/00; B05D 1/00; B05D 3/12; B05D 3/007; B05D 1/28; B05D 1/12; B41F 19/002; B41F 19/005; B41F 31/18; B41F 19/001; B44C 1/28; B44C 1/24; B44F 9/10; C23C 24/04; C09D 1/00; C09D 5/38; B41C 1/184; B41M 1/00; B41M 1/04; B41M 3/001; B41M 5/0017; B41M 1/22; B41M 5/00; B41M 3/00; B41J 2/0057
See application file for complete search history.

(56) References Cited

U.S. PATENT DOCUMENTS

| 3,264,132 | A | 8/1966 | Merrill |
| 4,141,313 | A | 2/1979 | Hefele |
| 4,465,538 | A | 8/1984 | Schmoock |
| 4,687,531 | A | 8/1987 | Potoczky |
| 4,741,918 | A | 5/1988 | Nagy De Nagybaczon |
| 4,985,733 | A | 1/1991 | Kurotori |
| 5,083,710 | A | 1/1992 | McLoughlin |
| 5,101,759 | A | 4/1992 | Hefele |
| 5,280,052 | A * | 1/1994 | Questel .............. B29C 70/60 428/325 |
| 5,520,973 | A | 5/1996 | Kamen |
| 5,735,994 | A | 4/1998 | Lappe |
| 5,751,327 | A | 5/1998 | De Cock |
| 6,132,547 | A | 10/2000 | Marsh |
| 6,214,106 | B1 * | 4/2001 | Weber ................ C09C 1/3684 106/442 |
| 6,469,728 | B1 | 10/2002 | Charnitski |
| 6,487,002 | B1 | 11/2002 | Biegelsen |
| 6,620,234 | B1 * | 9/2003 | Kostelnik ............ C09C 1/3684 106/445 |
| 6,623,816 | B1 | 9/2003 | Tanikawa |
| 7,002,613 | B2 | 2/2006 | Beier |
| 7,776,196 | B2 | 8/2010 | Fujimoto |
| 9,181,085 | B2 | 11/2015 | Yoon |
| 10,049,351 | B2 | 8/2018 | Stiernagle |
| 10,061,200 | B2 | 8/2018 | Rubin Ben Haim |
| 10,095,742 | B2 | 10/2018 | Duan |
| 10,244,046 | B2 | 3/2019 | Kaul |
| 10,336,059 | B2 | 7/2019 | Landa |
| 10,583,455 | B2 | 3/2020 | Landa |
| 2002/0031645 | A1 | 3/2002 | Sano et al. |
| 2002/0159801 | A1 | 10/2002 | Nakashima |
| 2003/0067529 | A1 | 4/2003 | May |
| 2003/0129302 | A1 | 7/2003 | Chambers |
| 2005/0022730 | A1 | 2/2005 | Rizzoli |
| 2005/0244584 | A1 | 11/2005 | Afshar |
| 2006/0003097 | A1 | 1/2006 | Andres |
| 2006/0046005 | A1 * | 3/2006 | McGee .................. B32B 27/08 428/34.4 |
| 2006/0109440 | A1 | 5/2006 | Willem Herman De Jager |
| 2006/0147637 | A1 | 7/2006 | Cooprider |
| 2006/0165444 | A1 | 7/2006 | Nanjo |
| 2007/0281136 | A1 | 12/2007 | Hampden-Smith |
| 2008/0166495 | A1 | 7/2008 | Maeno |
| 2008/0181667 | A1 | 7/2008 | Nomura |
| 2009/0009580 | A1 | 1/2009 | Nomura |
| 2009/0140631 | A1 | 6/2009 | Jo |
| 2009/0317555 | A1 | 12/2009 | Hori |
| 2010/0020835 | A1 | 1/2010 | Anan |
| 2010/0080594 | A1 | 4/2010 | Sowa |
| 2010/0178308 | A1 * | 7/2010 | Iwasa ................ C09C 1/0015 424/401 |
| 2010/0208351 | A1 | 8/2010 | Nofi et al. |
| 2012/0103212 | A1 | 5/2012 | Stowe |
| 2012/0212551 | A1 | 8/2012 | Furukawa |
| 2012/0285617 | A1 | 11/2012 | Azami |
| 2013/0065019 | A1 * | 3/2013 | Campeau ............ B32B 27/08 428/143 |
| 2013/0209758 | A1 * | 8/2013 | Campeau ............ B32B 27/08 428/206 |
| 2013/0233189 | A1 | 9/2013 | Wittmann |
| 2013/0235116 | A1 | 9/2013 | Takemoto |
| 2013/0257992 | A1 | 10/2013 | Panchawagh |
| 2013/0295328 | A1 | 11/2013 | Baran, Jr. |
| 2014/0063161 | A1 | 3/2014 | Liu |
| 2014/0141184 | A1 | 5/2014 | Yoon |

(56) References Cited

U.S. PATENT DOCUMENTS

| | | |
|---|---|---|
| 2014/0168330 A1 | 6/2014 | Liu |
| 2014/0209691 A1 | 7/2014 | Finn |
| 2014/0329729 A1* | 11/2014 | Becker-Willinger ........................ C09D 5/027 508/106 |
| 2015/0118389 A1 | 4/2015 | Jang |
| 2017/0008272 A1 | 1/2017 | Landa |
| 2017/0072428 A1 | 3/2017 | Landa |
| 2017/0075226 A1 | 3/2017 | Nagler |
| 2018/0178244 A1 | 6/2018 | Landa |
| 2018/0200751 A1 | 7/2018 | Landa |

FOREIGN PATENT DOCUMENTS

| | | |
|---|---|---|
| DE | 19707157 | 8/1998 |
| EP | 0195857 | 10/1986 |
| EP | 1359792 | 11/2003 |
| EP | 1280612 B1 | 4/2004 |
| EP | 2036734 | 3/2009 |
| EP | 2481597 | 8/2012 |
| GB | 712437 | 7/1954 |
| GB | 0830836 | 3/1960 |
| GB | 2034608 | 6/1980 |
| GB | 2259888 | 3/1993 |
| GB | 2353532 | 2/2001 |
| GB | 2368313 | 5/2002 |
| GB | 2536361 | 9/2016 |
| JP | S52013553 | 2/1977 |
| JP | S60171586 | 9/1985 |
| JP | S60245589 | 12/1985 |
| JP | S6168253 | 4/1986 |
| JP | H02290273 | 11/1990 |
| JP | H1070151 | 3/1998 |
| JP | H10151390 | 6/1998 |
| JP | H11188921 | 7/1999 |
| JP | H11239741 | 9/1999 |
| JP | 2002045777 | 2/2002 |
| JP | 2002182019 | 6/2002 |
| JP | 2002254696 | 9/2002 |
| JP | 2004090330 | 3/2004 |
| JP | 2005004038 | 1/2005 |
| JP | 2005508746 | 4/2005 |
| JP | 2005140945 | 6/2005 |
| JP | 2006263537 | 10/2006 |
| JP | 2007038142 | 2/2007 |
| JP | 2008526476 | 7/2008 |
| JP | 2008194897 | 8/2008 |
| JP | 2012066227 | 4/2012 |
| JP | 2012171184 | 9/2012 |
| JP | 2012179724 | 9/2012 |
| JP | 2014168946 | 9/2014 |
| WO | 1995031337 | 11/1995 |
| WO | 1999065699 | 12/1999 |
| WO | 2010077779 A2 | 7/2010 |
| WO | 2012156728 A1 | 11/2012 |
| WO | 2013132418 | 9/2013 |
| WO | 2013191535 | 12/2013 |
| WO | 2014063161 | 4/2014 |
| WO | 2016189513 | 12/2016 |
| WO | 2016189514 | 12/2016 |
| WO | 2016189515 | 12/2016 |
| WO | 2016189516 | 12/2016 |
| WO | 2016189519 | 12/2016 |

OTHER PUBLICATIONS

International Search Report and Written Opinion for International Patent Application No. PCT/IB2016/053146, dated Oct. 10, 2016.
International Search Report and Written Opinion for International Patent Application No. PCT/IB2016/053145, dated Oct. 7, 2016.

\* cited by examiner

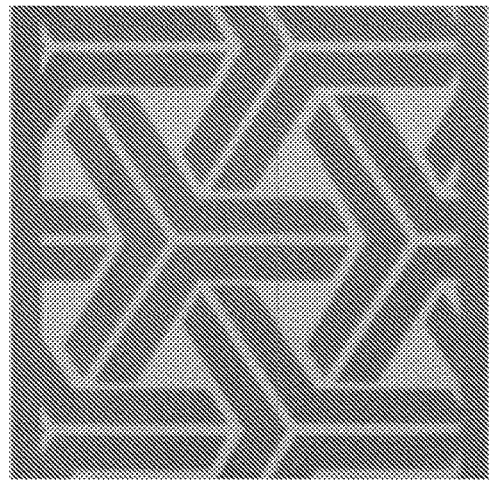
Fig. 4A
Fig. 4B
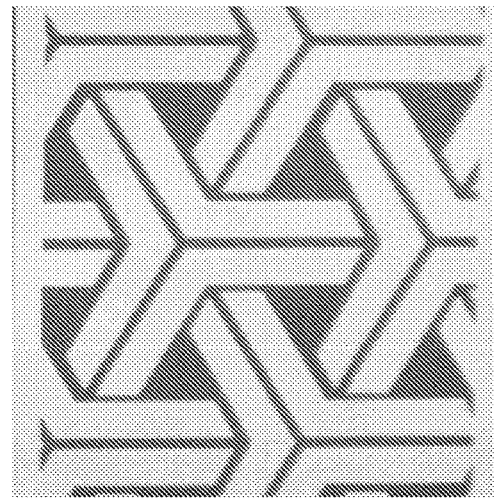
Fig. 4D
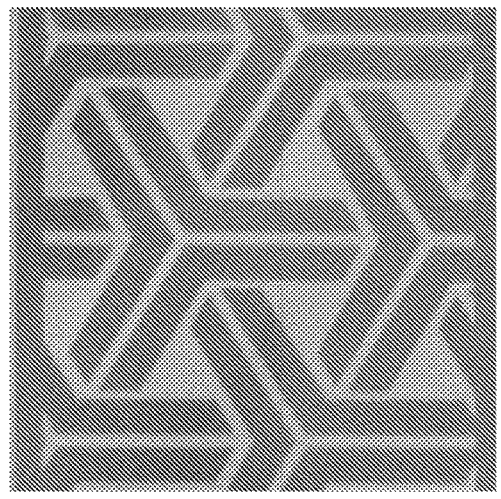
Fig. 4C

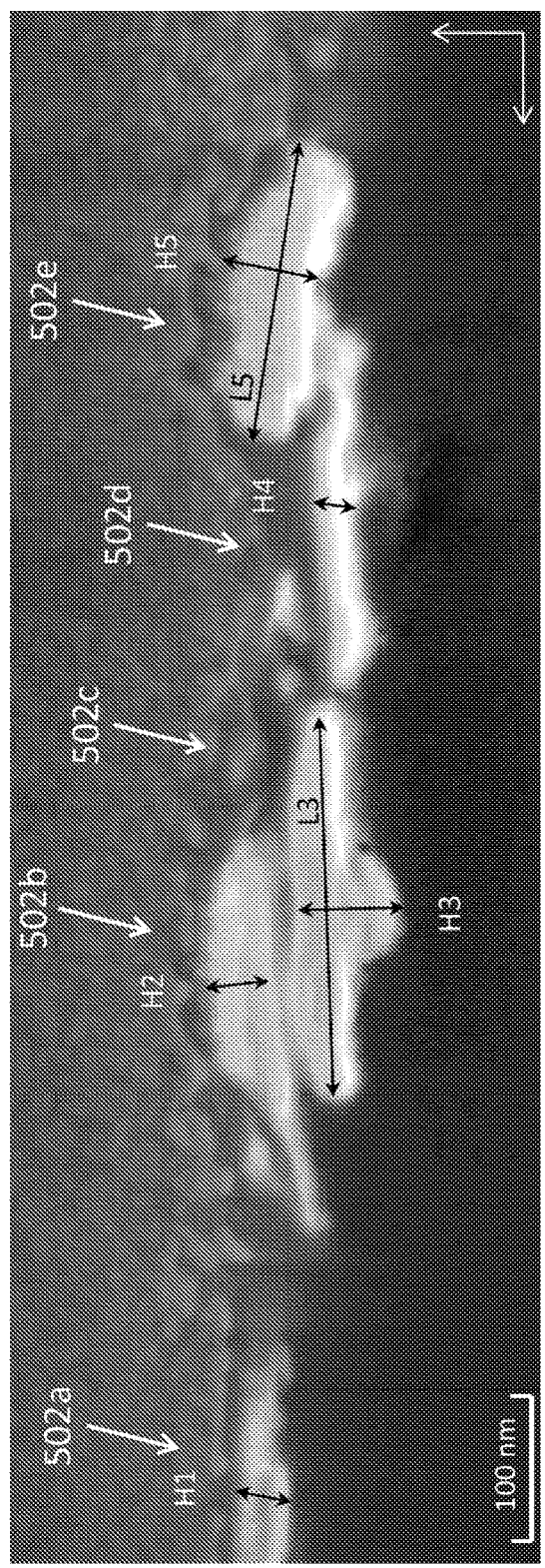
Fig. 6A
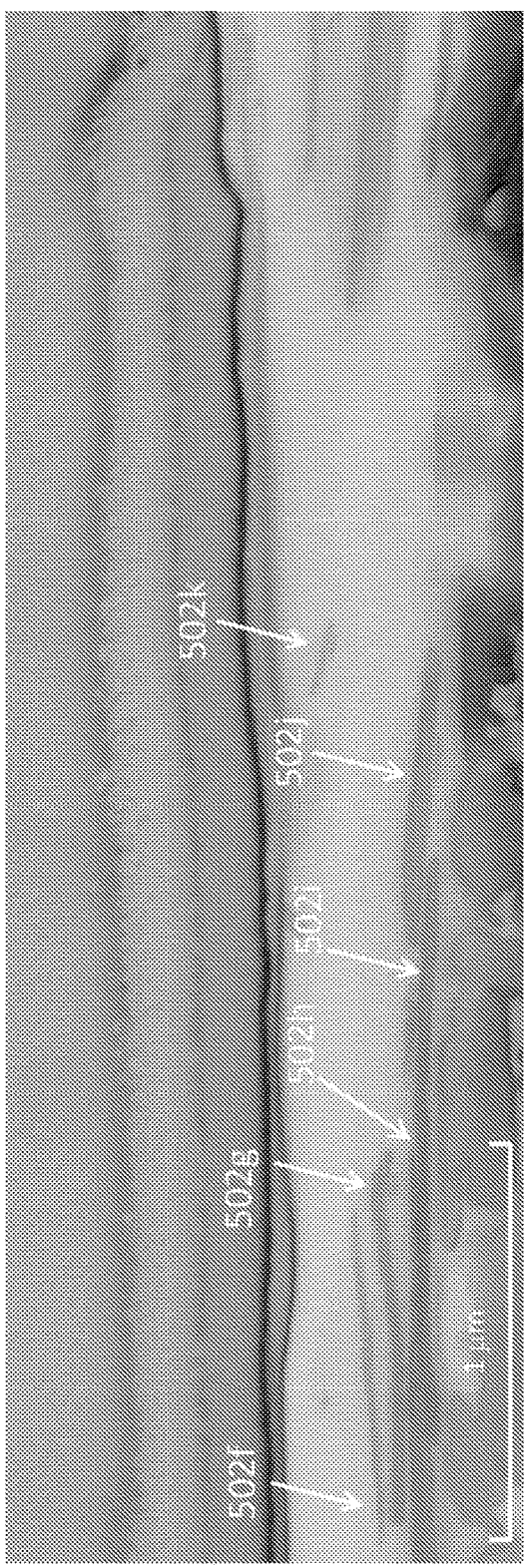
Fig. 6B – Prior Art

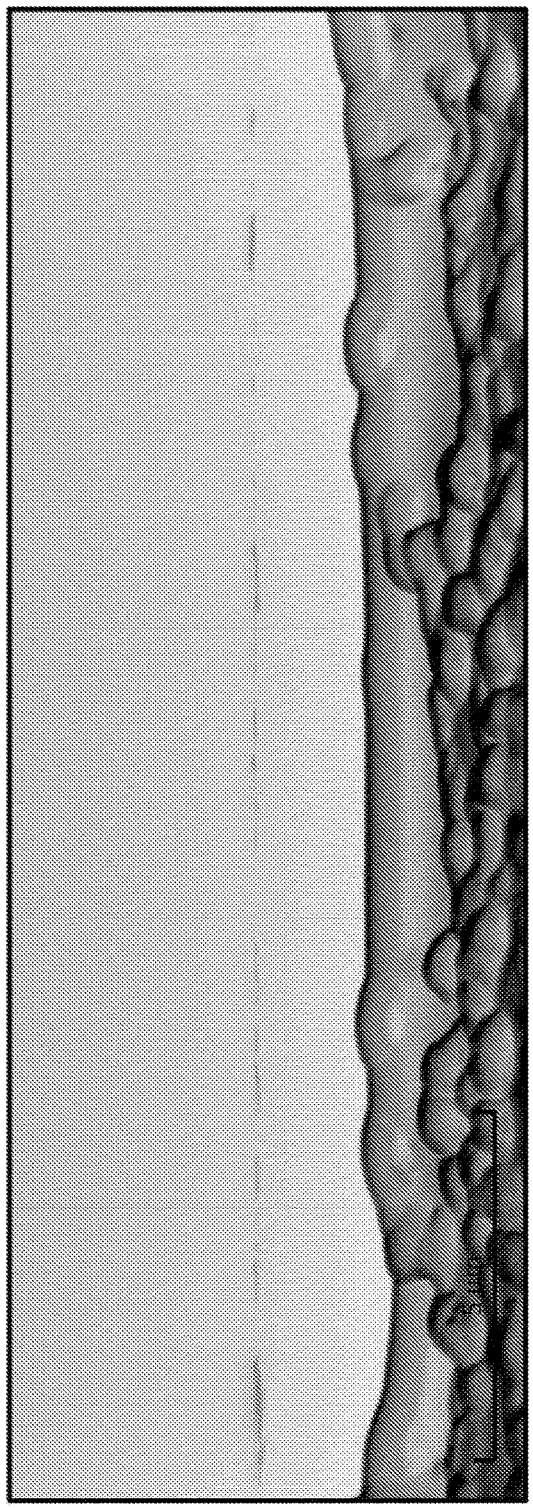
Fig. 6C
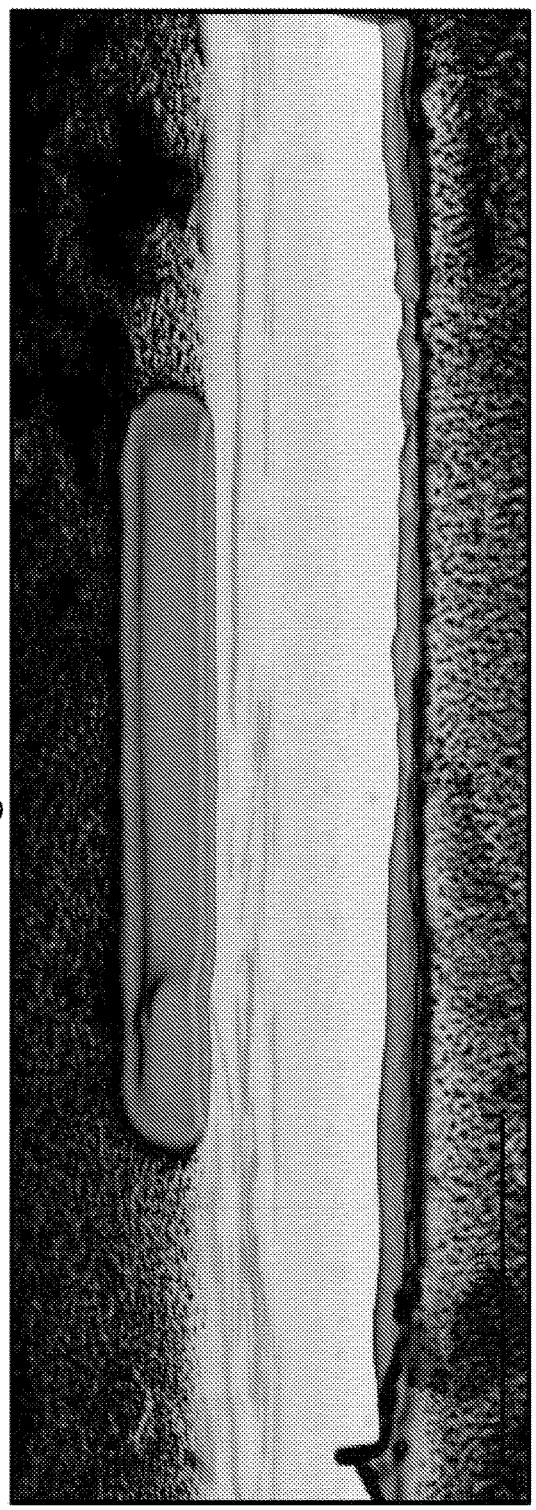
Fig. 6D – Prior Art

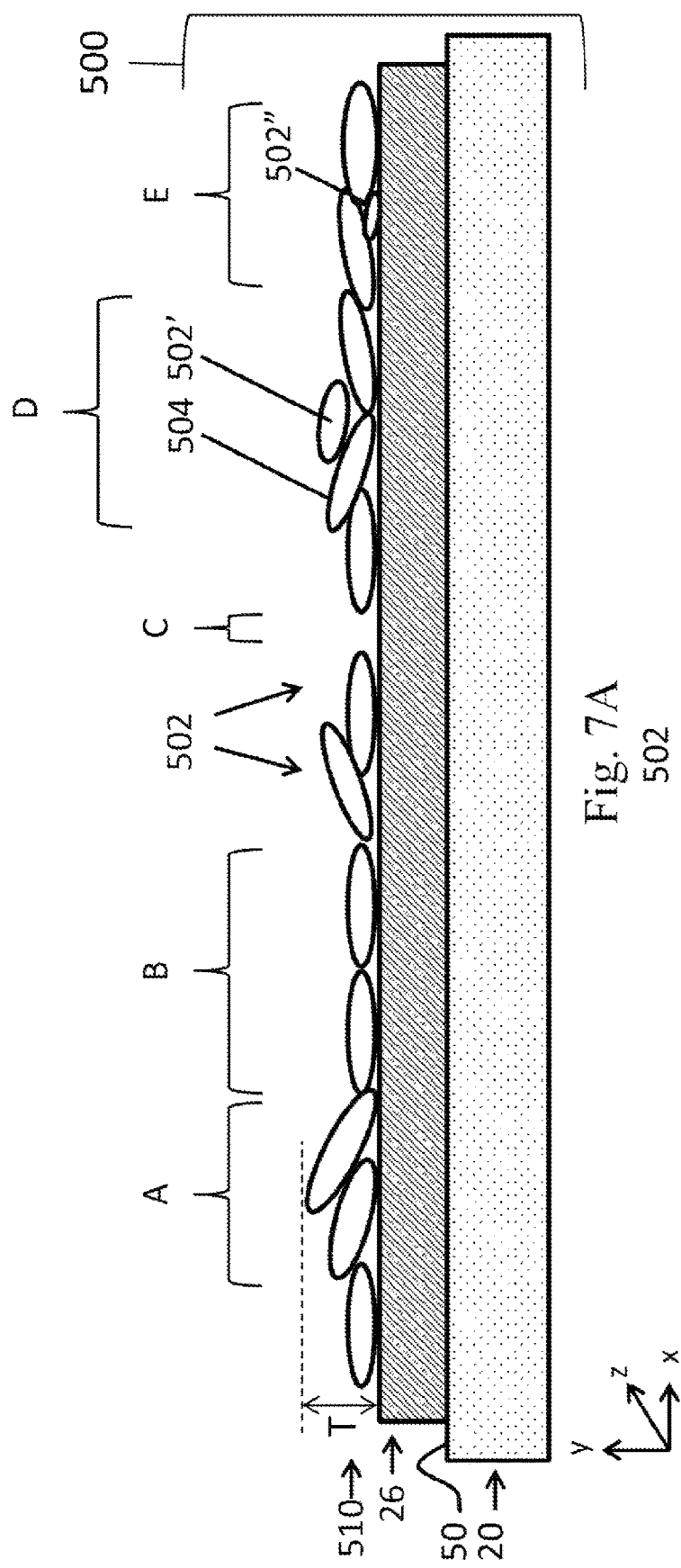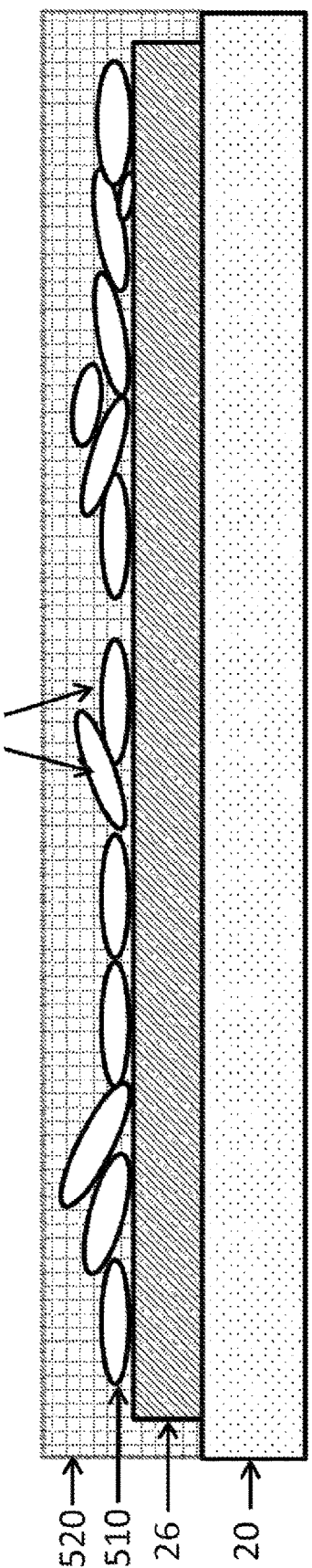

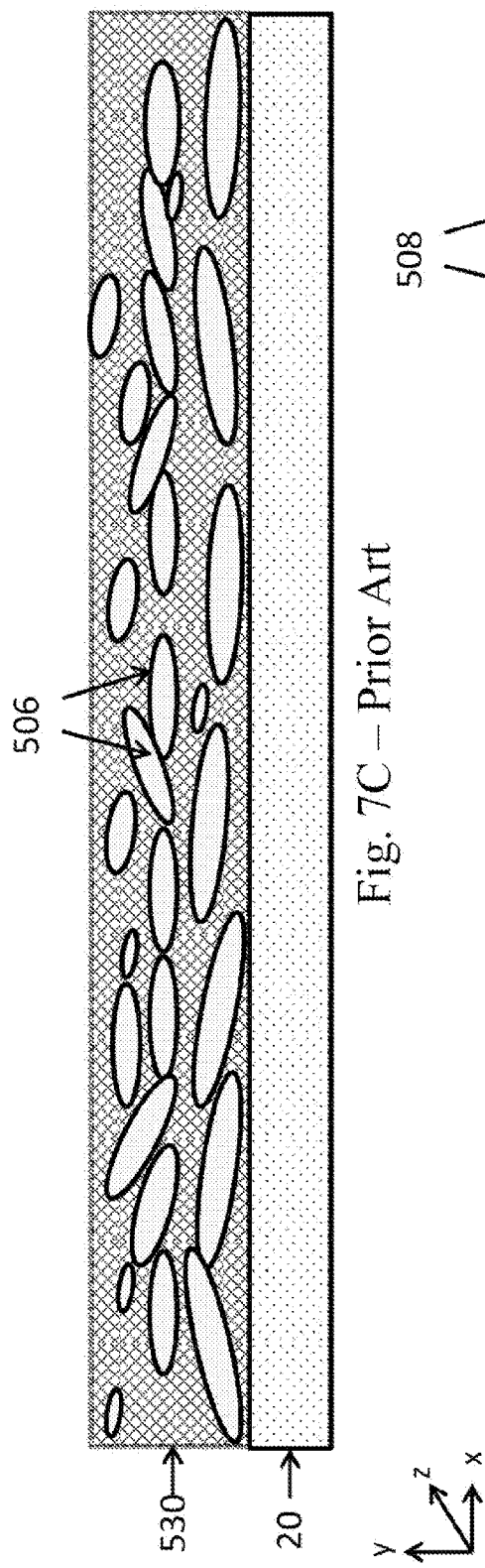
Fig. 7C – Prior Art
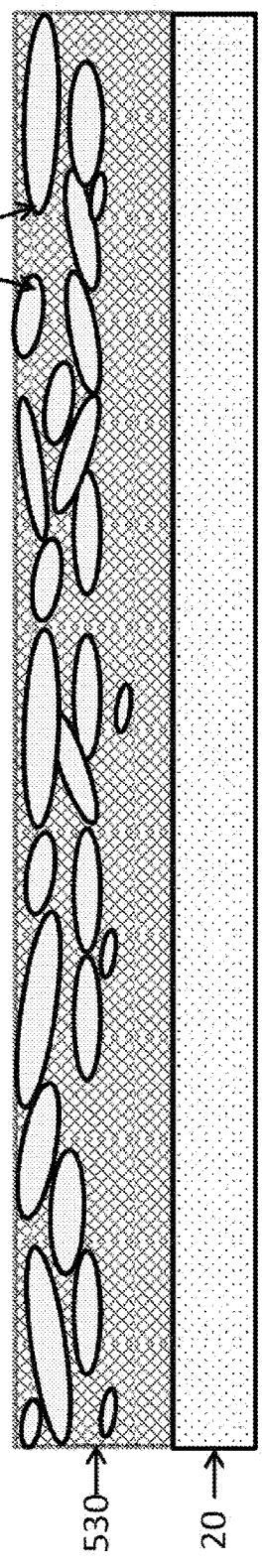
Fig. 7D – Prior Art
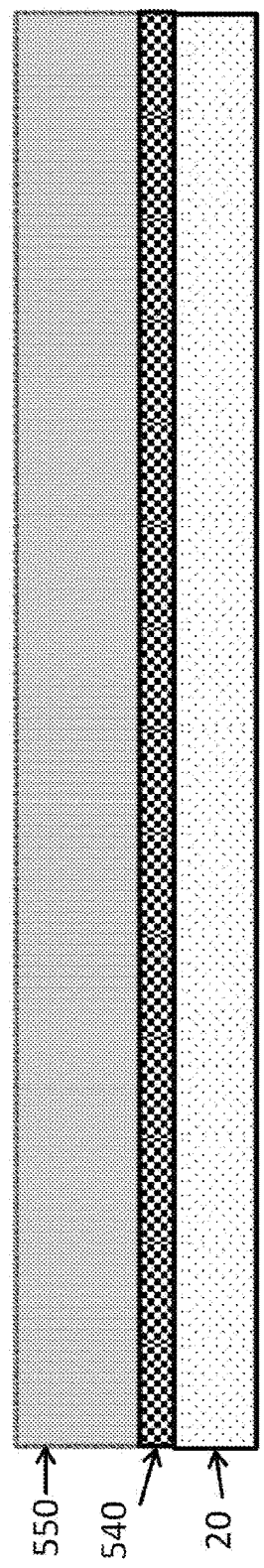
Fig. 7E – Prior Art

METAL PRINTED CONSTRUCTIONS

CROSS-REFERENCE TO RELATED APPLICATIONS

This application is a U.S. national phase application filed under 35 U.S.C. § 371 of International Application No. PCT/IB2016/053154, filed May 27, 2016, designating the United States and claiming priority to British Patent Application No. 1509080.6, filed May 27, 2015; British Patent Application No. 1514618.6, filed Aug. 17, 2015; British Patent Application No. 1514619.4; filed Aug. 17, 2015, British Patent Application No. 1603997.6, filed Mar. 8, 2016; and British Patent Application No. 1604989.2, filed Mar. 23, 2016.

FIELD

The present disclosure relates to printed constructions obtainable from a metal printing method.

BACKGROUND

Two main approaches exist for the printing of metallised surfaces or patterns on a substrate. The most commonly used is foil imaging, which falls into two broad categories. In hot foil blocking, also known as foil stamping, a heated die is stamped onto a foil that is placed against the substrate. The foil has a coating, often of metal, and the application of heat and pressure causes the coating to adhere to the substrate so as to leave the design of the die on the substrate. At the same time, the metal coating is removed to leave behind on the foil a depleted region of the corresponding shape. Foil fusing or cold foil stamping is a related process avoiding the need for a die, wherein the foil is bonded to an image area that is covered by an adhesive. The adhesive image can be created using printing plates or cylinders, as in offset, flexographic and gravure printers, using printing screens, as in serigraphic printers, or using image specific patterns, as in digital printers. Such foils typically comprise, layered in the following order, a carrier film, a release layer enabling the separation of a following pigment or metal layer upon impression, and an adhesive layer facilitating the attachment of the preceding color-imparting layer to the printing substrate. Additional layers can be intercalated in this basic structure, such as a lacquer between a release layer and a metal layer, for example. Though such metal foils can be tens of micrometers thick, the thickness of the fully continuous metal layer or film in such laminated foils is generally of a few micrometers, typically less than one, some metal foils even providing a thin integral metal coat of less than one hundred nanometers.

One of the main disadvantages of foil stamping and fusing is the large amount of foil that is wasted during each stamp/fuse process, as any foil area that is not transferred to form the desired image on the substrate cannot be recovered for successive prints. Since foils, especially metal foils are expensive, foil imaging processes are relatively high cost methods, as typically a roll of foil can only be used once and, when discarded, only a small fraction of the coating will have been used.

In the second approach, the metallic appearance is provided by particles of metals suspended in ink formulations, and applied to printing substrates in ways similar to any other conventional ink where the coloring agent would instead be a pigment or a dye. While the use of metal inks can reduce the wastage inherent to foil printing, it results in different drawbacks. There have been reports that printing methods making use of this alternative, did not, for example, achieve the print quality affordable from foil printing.

The Applicant has recognized the need for improved printing methods and systems that are more cost effective and environmentally friendly, yet produce quality print constructions.

SUMMARY

The Applicant has invented a novel printing method described in more detail in co-pending patent application No. PCT/I132016/053145. The present disclosure is concerned by the print constructions that may be obtained by the method, which is therefore briefly introduced herein to facilitate an understanding of the present teachings, The printing method comprises providing a donor surface, coating the donor surface with individual particles (e.g., at a coating station), and repeatedly performing the steps of: (i) treating the substrate surface (e.g., at a treating station) to render the affinity of the particles to at least selected regions of the substrate surface greater than the affinity of the particles to the donor surface, (ii) pressing the substrate surface against the donor surface (e.g., at an impression station) to cause a monolayer of particles to transfer from regions of the donor surface only to the selected regions of the substrate surface (thus creating exposed regions of the donor surface in regions corresponding to the selected regions), and (iii) recoating the donor surface with a fresh layer of particles so that only the regions of the donor surface exposed by the transfer of the particles from the donor surface to the substrate in step (ii) are replenished to permit printing of a subsequent image on a substrate surface.

The donor surface coated with particles is used in a manner analogous to the foil used in foil imaging. However, unlike foil imaging, the damage caused to the continuity of the particle layer on the donor surface by each impression can be repaired by re-coating only the exposed regions of the donor surface from which the previously applied layer has been stripped by transfer to the selected regions of the substrate.

The reason that the particle layer on the donor surface can be repaired after each impression is that the particles are selected to adhere to the donor surface more strongly than they do to one another. This results in the applied layer being substantially a monolayer of individual particles. The term "monolayer", defined more rigorously herein-below, is used herein to describe a layer in which—ideally—each particle has at least a portion that is in direct contact with a substrate, such as the donor surface of a coating apparatus prior to impression or the receiving surface of a printing substrate. While some overlap may occur between particles contacting any such surface, the layer may be only one particle deep over a major proportion of the area of the surface. This occurs for the same reason that an adhesive tape, when used to pick up a powder from a surface, will only pick up one layer of powder particles. When the adhesive tape is still fresh, the powder will stick to the adhesive until it covers the entire tape surface. However, once the adhesive has been covered with powder, the tape cannot be used to pick up any more powder because the powder particles will not stick strongly to one another and can simply be brushed off or blown away from the tape. Similarly, the monolayer herein is formed from the particles in sufficient contact with the donor surface and is therefore typically a single particle thick. Contact is said to be sufficient when it allows the particle to remain attached to the donor surface at the exit of the coating station, e.g., following surplus extraction, burnishing, or any other like step, some of which will be described in more detail, in exemplary fashion, hereinbelow.

Taking, for example, a platelet shaped particle contacting the donor surface over most of its planar face (e.g., being substantially parallel), the resulting thickness of the monolayer (in the direction perpendicular to the surface) would approximately correspond to the thickness of the particle, hence the average thickness of the monolayer can be approximated by the average thickness of the individual particles forming it. However, as there could be partial overlaps between adjacent particles, the thickness of the monolayer can also amount, in some places, to a low multiple of the dimension of the constituting particles, depending on the type of overlap, for instance on the relative angles the particles may form with one another and/or with the donor surface and/or the extent of the overlap and the like. A monolayer may therefore have a maximum thickness (T) corresponding to about one-fold, or about two-fold, or about three-fold, or any intermediate value, of a thinnest dimension characteristic to the particles. For flakes, platelets, and the like, the thinnest dimension is the particle thickness, while for generally spherical particles, the "thinnest" dimension is essentially the particle diameter. The thickness of the thinnest characteristic dimension of a particle, or population thereof, may generally be estimated by microscope techniques, for instance from SEM or SEM-FIB images, and can be quantitatively determined for each particle, or for the entire field of view of the image.

Because the layer is a monolayer mosaic of particles, if the surface on entering the coating station already carries a particle layer which is discontinuous (because particles have been stripped from selected regions of a previously applied continuous layer), then the depleted or exposed regions alone can be replenished with particles without depositing fresh particles on those regions of the previously applied layer that are still intact.

It will be appreciated that as the printing method above-described allows the particles to form a monolayer on the donor surface, the particles transferred therefrom also form a monolayer on the selected regions of the substrate surface. The present disclosure is concerned by print constructions that can be printed using this inventive method.

For a relatively light effect or matte appearance, the area coverage by the mosaic of particles can be smaller (e.g., below 50%) than for glossy or mirror-like appearance. For such high gloss visual appearance, the mosaic of particles can sufficiently cover the target surface so that the reflection resulting from the particles transferred to the substrate is suitable for the desired visual effect. For the same effect, and assuming all other parameters are equivalent, particles having a relatively higher reflectivity and/or more parallel orientation with the printing substrate may only need to cover a smaller percent area of the target surface than particles having a relatively lower reflectivity and/or a more random/less parallel orientation relative to the substrate. The relative reflectivity relates to the properties of the respective particles and can also be affected by the characteristics of the substrate, features of the background image, and any such considerations readily understood by persons skilled in the art of metal printing. By "sufficient" covering, it is meant that the coat of particles on the relevant substrate regions will be devoid of defects perceptible to the naked eye, such as discontinuities or holes in the mosaic of particles that would expose the substrate surface to an extent visually detectable and detrimental to the intended visual effect. Having at least 50% of the area of the surface of the selected substrate region(s) to be coated, or at least 60%, or at least 70% of this area covered by particles may be sufficient coverage (i.e., providing for a sufficiently continuous layer of particles).

For high end mirror-like appearance substantially the whole of the selected surfaces of the substrate to be coated may need to be covered. By "substantially" covering, it is meant that, as for sufficient covering, the coat of particles on the relevant substrate regions will be devoid of visible defects, such as discontinuities or holes in the mosaic of particles that would expose the substrate surface to an extent detectable by the naked eye. Having at least 80% of the area of the surface of the selected substrate region(s) to be coated by particles, or at least 85%, or at least 90% or at least 95% of the area covered by particles is considered a substantial coverage (i.e., providing for a substantially continuous layer of particles).

As such sufficiently or substantially continuous layers of particles on the substrate surface, or part thereof, results from the transfer of same particles from the donor surface, it is to be understood that a sufficiently coated donor surface will correspondingly have at least 50%, or at least 60%, or at least 70% of its area covered by particles, while a substantially fully coated donor surface will correspondingly have at least 80%, or at least 85%, or at least 90% or at least 95% of its area covered by particles. As mentioned, for lower end effect, an area coverage of less than 50% can be satisfactory. Thus depending on the desired effect and on the particles involved, a monolayer of up to 50% area coverage can be used according to the present teachings. Depending on the surface being considered, the percent area coverage can be of at least 10%, or at least 20% or at least 30%.

For matte effects, the particle can be selected to provide such a look or can be oriented on the printing substrate in a manner providing such effect. As readily understood, particles being non-parallel with the surface of a substrate, even if being reflective, may diffract light in a way resulting in an overall matte effect. A matte effect can therefore be achieved by using a substrate having a relatively rough surface, a relatively thin receptive layer maintaining the roughness of the particle reception surface or any other substrate with a relatively thick receptive layer, the particle reception surface being patterned to provide for a surface roughness providing such "non-parallel" or random orientation of the particles and matte effect.

The percentage of an area covered by particles out of a specific target surface can be assessed by numerous methods known to skilled persons, including by determination of optical density possibly in combination with the establishment of a calibration curve of known coverage points, by measurement of transmitted light if either the particles or the substrate are sufficiently transparent, or conversely, by measurement of reflected light, for instance if the particles are reflective.

As used in the specification, a preferred method of determining the percentage area of a surface of interest covered by particles is as follows. Squared samples having 1cm edges are cut from the surface being studied (e.g., from the donor surface or from the printed substrate). The samples are analyzed either by optical microscopy (Olympus, BX61 U-LH100-3) or by laser confocal microscopy (Olympus, LEXT OLS30ISU) at a magnification of up to ×100 (yielding a field of view of at least about 128.9 μm×128.6 μm). At least three representative images are captured in reflectance mode for each sample printed on an opaque substrate (e.g., paper). The captured images were analyzed using ImageJ, a public domain Java image-processing program developed by the National Institute of Health (NIH), USA. The images are displayed in 8-bit, gray scale, the program being instructed to propose a threshold value of reflectance differentiating between the reflective particles (lighter pixels) and the interstices that may exist between neighboring or adjacent particles (such voids appearing as darker pixels). A trained operator may adjust the proposed threshold value, if needed, but typically confirms it. The image analysis program then proceed to measure the amount of pixels representing the particles and the amount of pixels representing the uncovered areas of the intra-particle voids, from which the percent area of coverage can be readily calculated. Measurements done on the different image sections of the same sample are averaged. When the samples are printed on a transparent substrate (e.g., a translucent plastic foil), a similar analysis can be done in transmittance mode, the particles appearing as darker pixels and the voids as lighter ones. Results obtained by such methods, or by any substantially similar analytical techniques known to those of skill in the art, are referred to as optical surface coverage, which can be expressed in percent or as a ratio.

If printing is to take place on the entire surface of the substrate, the receptive layer, which may for example be an adhesive, may be applied to the substrate by a roller before it is pressed against the donor surface. If printing is only to take place on selected regions of the substrate, on the other hand, then it is possible to apply the adhesive by any conventional printing method, for example by means of a die or printing plates, or by jetting the receptive layer onto the surface of the substrate. As a further possibility, it is possible to coat the entire surface of the substrate with an activatable receptive layer that is selectively rendered "tacky" by suitable activation means. Whether selectively applied or selectively activated, the receptive layer in such case forms a pattern constituting at least part of the image being printed on the substrate.

The term "tacky" is used herein only to indicate that the substrate surface, or any selected region thereof, has sufficient affinity to the particles to separate them from the donor surface and/or to retain them on the substrate, when the two are pressed one against the other at an impression station, and it need not necessarily be tacky to the touch. To permit the printing of patterns in selected regions of the substrate, the affinity of the receptive layer, activated if needed, towards the particles need be greater than the affinity of the bare substrate to the particles. In the present context, a substrate is termed "bare" if lacking a receptive layer or lacking a suitably activated receptive layer, as the case may be. Though the bare substrate should for most purposes have substantially no affinity to the particles, to enable the selective affinity of the receptive layer, some residual affinity can be tolerated (e.g., if not visually detectable) or even desired for particular printing effects.

The receptive layer may, for instance, be activated by exposure to radiation (e.g., UV, IR and near IR) prior to being pressed against the donor surface. Other means of receptive layer activation include temperature, pressure, moisture (e.g., for rewettable adhesives) and even ultra sound, and such means of treating the receptive layer surface of a substrate can be combined to render tacky the compatible receptive layer.

Though the nature of the receptive layer being applied to the surface of the substrate may differ, among other things, from substrate to substrate, with the mode of application and/or the selected means of activation, such formulations are known in the art and need not be further detailed for an understanding of the present printing method and system. Briefly, thermoplastic, thermosetting or hot-melt polymers compatible with the intended substrate and displaying sufficient tackiness, relative affinity, to the envisioned particle, optionally upon activation, can be used for the implementation of the present disclosure. Preferably the receptive layer is selected so that it does not interfere with the desired printing effect (e.g., clear, transparent, and/or colorless).

A desired feature of the suitable adhesives relates to the relatively short time period required for activating the receptive layer, i.e. selectively changing the receptive layer from a non-tacky state to a tacky state, increasing the affinity of the selected region of the substrate so that it becomes sufficiently adherent to the particles to separate them from the donor surface. Fast activation times enable the receptive layer to be used in high-speed printing. Adhesives suitable for implementation of the present disclosure are preferably capable of activation within a period of time no longer than the time it takes the substrate to travel from an activating station to the impression station. In some embodiments, activation of the receptive layer can take place substantially instantaneously at the time of the impression. In other embodiments, the activation station or step may precede the impression, in which case the receptive layer can be activated within a time period of less than 10 seconds or 1 second, in particular in a time period of less than about 0.1 second and even less than 0.01 second. This time period is referred to herein as the receptive layer's "activation time."

A receptive layer requiring activation to gain sufficient affinity, needs to remain in such state long enough to at least allow transfer of the particles from the donor surface to the printing substrate before the receptive layer loses its tackiness. In some printing systems the receptive layer may be applied on each substrate "in-line" upstream of the impression station, so as to be deposited in tacky form. The period of time during which the receptive layer is sufficiently tacky for the intended system is described herein as the "open time" of the receptive layer. Suitable adhesives exhibit an open time commensurate with the transfer conditions and/or the subsequent stations or steps of the particular printing system or process. If, for instance, the printing system is to comprise a plurality of coating stations, it is desired that the receptive layer selectively activated at or prior to reaching a first station revert to a non-tacky state before it reaches a second coating station at which the treatment of the substrate could be applied to a different portion, most likely to adhere to particles having different properties (e.g., different colors). In some printing systems, the receptive layer may be constantly tacky, its "infinite" open time being de facto limited by the subsequent application of the particles, which block its later ability to further adhere to additional particles.

Generally open times of activated adhesives are suitably of at least from about 0.01 second to a few seconds (e.g., up to 10 seconds), though longer open times (e.g., of a few minutes) may be suitable for certain applications and "infinite" open times can be suitable when the receptive layer is being applied in tacky stage (in other words, "already activated") in a desired pattern upstream of the impression station (e.g., the substrate is treated by deposition of a tacky material on its surface).

Independently of the printing method having been used to apply or activate the receptive layer to the image receiving side of a substrate, such application or activation being optionally selective so as to form a desired pattern, a receptive layer suitable for a print construction may be selected as follows.

As already mentioned, a suitable receptive layer needs have sufficient affinity with the particles due to form the monolayer according to the present teachings. This affinity, which can be alternatively considered as an intimate contact between the two, needs to be sufficient to retain the particles on the surface of the receptive layer and can result from the respective physical and/or chemical properties of the layer and the particles. For instance, the receptive layer may have a hardness sufficiently high to provide for satisfactory print quality, but sufficiently low to permit the adhesion of the particles to the layer. Such optimum range can be seen as enabling the receptive layer to be "locally deformable" at the scale of the particles, so as to form sufficient contact. Such affinity or contact can be additionally increased by chemical bonding. For instance, the materials forming the receptive layer can be selected to have functional groups suitable to retain the particles by reversible bonding (supporting non-covalent electrostatic interactions, hydrogen bonds and Van der Waals interactions) or by covalent bonding. Likewise, the receptive layer needs be suitable to the intended printing substrate, all above considerations being known to the skilled person.

The receptive layer can have a wide range of thicknesses, depending for example on the printing substrate and/or on the desired printing effect. A relatively thick receptive layer can provide for an "embossing" aspect, the design being raised above the surface of the surrounding substrate. A relatively thin receptive layer can follow the contour of the surface of the printing substrate, and for instance for rough substrates enable a matte aspect. For glossy aspect, the thickness of the receptive layer is typically selected to mask the substrate roughness, so as to provide an even surface. For instance, for very smooth substrates, such as plastic films, the receptive layer may have a thickness of only a few tens of nanometers, for example of about 100 nm for a polyester film (for instance a polyethylene terephthalate (PET) foil) having a surface roughness of 50 nm, smoother PET films allowing to use even thinner receptive layers. Substrates having rougher surfaces in the micron or tens of microns range will benefit of a receptive layer having a thickness in the same size range or order of size range, if glossy effect, hence some leveling/masking of substrate roughness is desired. Therefore depending on the substrate and/or desired effect, the receptive layer can have a thickness of at least 10 nm, or at least 50 nm, or at least 100 nm, or at least 500 nm, or at least 1,000 nm. For effects that can be perceptible by tactile and/or visual detection, the receptive layer may even have a thickness of at least 1.2 micrometers (µm), at least 1.5 µm, at least 2 µm, at least 3 µm, at least 5 µm, at least 10 µm, at least 20 µm, at least 30 µm, at least 50 µm, or at least 100 µm. Though some effects and/or substrates (e.g., cardboard, carton, fabric, leather and the like) may require receptive layers having a thickness in the millimeter range, the thickness of the receptive layer typically does not exceed 800 micrometers (µm), being at most 600 µm, at most 500 µm, at most 300 µm, at most 250 µm, at most 200 µm, or at most 150 µm.

After printing has taken place, namely after the particles are transferred from the donor surface to the tacky regions of the treated substrate surface (i.e., the receptive layer) upon pressing, the substrate may be further processed, such as by application of heat and/or pressure, to fix or burnish the printed image and/or it may be coated with a varnish (e.g., colorless or colored transparent, translucent or opaque over-coat) to protect the printed surface and/or it may be over-printed with an ink of a different color (e.g., forming a foreground image). While some post-transfer steps may be performed on the entire surface of the printed substrate (e.g., further pressure), other steps may be applied only to selected parts thereof. For instance, a varnish may be selectively applied to parts of the image, for instance to the selected regions coated with the particles, optionally further imparting a coloring effect.

The particles may include any material to be applied to the surface of the substrate. In particular, suitable material for the particles may include compounds providing for a desired printing effect and encompass coloring agents (e.g., pigments and dyes) generally bound to a polymeric resin (e.g., a non-thermoplastic polymer) and any other material having a desired printing effect (e.g., providing a metallic look or a glittering effect etc.).

If the effect to be achieved is similar to foil imaging, such as used for instance for metal printing, then the particles may be grains or flakes of metals, such as aluminum, copper, iron, zinc, nickel, tin, titanium, gold or silver, or alloys, such as steel, bronze or brass, and like metallic compounds primarily including metals. In addition to being made of real metals, suitable particles can be made of compounds providing for a similar visual effect (e.g., made of a polymeric or ceramic material having a metallic appearance). Such "metal-like" materials are typically predominantly non-metallic, a metal coat optionally serving to provide the light reflectivity that may be perceived as metallic. By way of example, particles manufactured using the PVD (physical vapor deposition) method, wherein a polymer foil is vapor coated in vacuum with the metal of interest (including chrome, magnesium and the above-mentioned exemplary metals) and thereafter crushed to form individual flakes, may form metal-like particles if the polymer backbone is retained and can be deemed "metallic" if the polymer is eliminated following the deposition process.

If the effect to be achieved includes a glittering and/or a pearlescent and/or a nacreous effect, synthetic high polymers (including for example multi-layered structures of polyacrylates), magnesium fluoride, muscovite, aragonite, rutile or anatase titanium dioxide, mica compounds (typically coated with metal oxides) and the like can be used for the particles. All of the foregoing exemplary particles, including the genuinely metallic particles though collectively termed for simplicity "metal-looking" particles (i.e., providing a visual effect similar to a metallic compound), may be coated or uncoated.

The coating of the particles, which can be applied by physical but more typically chemical means, can, among other things, reduce or prevent the particles sticking to one another (e.g., as achievable with anti-caking agents and the like), increase the repulsion between the particles (e.g., as achievable by increasing the charge of the particles), protect the particles from undesired chemical modification (e.g., reduce, prevent or delay the oxidation of metals and alloys or any other deleterious aging of the metal-looking particles) or further increase the affinity of the particles to the donor surface or to the selected regions of the substrate, as desired (e.g., modify the hydrophobicity of the coats/surfaces).

Particles suitable for a printing system and method according to the present teachings may for example be coated by one or more of i) an unmodified or modified carboxylic acid or fatty acid, the carboxylic acid selected from the group comprising, but not limited to, stearic acid, palmitic acid, behenic acid, benzoic acid, and oleic acid; ii) an oily substance selected from the group comprising, but not limited to, vegetal oils, such as linseed oil, sunflower oil, palm oil, soya oil, and coconut oil; mineral oils and synthetic oils; and iii) an oxide which may be of same or different material as the core particle being coated. For instance, aluminum particles may be coated with an aluminum oxide or a silicon dioxide, and mica particles may be coated with titanium dioxide and iron oxide, for example. The particle coating may optionally modify the coloring effect of the core particle, this can be achieved for instance with some metal oxides or with pigmented polymers (e.g., a polyacrylate containing inorganic or organic absorption pigments). Such coloring effect can also result from the choice of the core particle, or from a partial oxidation of the same.

Whether colored polymers or metal-looking, the particles may provide, once transferred to the printing substrate, for a glossy or matte image, and for any other type of desired effect in accordance with the selected particles.

A printing system, implementing the above method, and enabling the preparation of printed constructions as herein disclosed may include a coating station which comprises a supply of particles suspended in a fluid, the particles adhering more strongly to the donor surface than to one another, an application device for applying the fluid to the donor surface in a manner to cause the particles suspended in the fluid to adhere to the donor surface so as to form a particle coating on the surface, and a surplus extraction system operative to extract fluid and to remove surplus particles that are not in direct contact with the surface, so as to leave only a monolayer of particles adhering to the donor surface on exiting the coating station.

The application device may comprise a spray head for spraying the fluid and suspended particles directly onto the donor surface. Alternatively, the application device may comprise a rotatable applicator operative to wipe the fluid and suspended particles onto the surface. When the particles are applied by the application device in a liquid fluid, the device may further comprise, if needed, a drying element enabling the particle coating to be substantially dry by the time it reaches a subsequent station. In some embodiments, the particles on the donor surface are substantially dry upon contacting of the receptive layer on the substrate at the impression station.

In the present disclosure, the term "suspended in" and its variations is to be understood as "carried by" and like terms, not referring to any particular type of mixture of materials of same or different phase.

The printing system suitable for the preparation of the present print constructions may be an offline, stand-alone machine, or may be in-line with a printing press and/or other finishing units. For instance, the printing system according to the present disclosure can serve as one station or module in offset, flexographic, gravure, serigraphic and digital printing presses.

Additionally, a printing system suitable for the present teachings may comprise, upstream of the coating station, more than a station for applying a receptive layer or treating the substrate to form it. For instance, the system may include a station for applying a background image, the receptive layer being subsequently applied or activated thereupon to form (following impression) a foreground image on the previously applied background. Conversely, the receptive layer can form a background image, whereas a foreground image is thereafter applied. The foreground and background images may form distinct parts of the image to be printed, but may also overlap. Each of the foreground and background images, if both are desired for a particular image to be printed, can be applied by any printing system.

For instance, a background image can be applied at a first station for flexographic printing of a colored surrounding, and a receptive layer can be applied at a second station, in a manner that may either at least partially overlap with the background image or in a separate non-overlapping region of the substrate.

The above-described printing method and printing system can have a wide range of uses in commercial and decorative printing, including in the publishing and packaging industry, where they can serve, for instance, to create decorative finishes (e.g., in luxury packaging) and anti-counterfeiting measures (e.g., in bank notes).

According to one aspect of the disclosure, there is provided a print construction including: (a) a printing substrate having an image-receiving surface; (b) a receptive layer, at least partially covering the image-receiving surface, and having a particle reception surface distally disposed to the image-receiving surface; and (c) a plurality of individual particles adhered to the particle reception surface, and forming a monolayer thereon.

According to another aspect of the disclosure, there is provided a metallized print construction including: (a) a printing substrate having an image-receiving surface; (b) a receptive layer, at least partially covering the image-receiving surface, and having a particle reception surface distally disposed to the image-receiving surface; and (c) a plurality of metal particles adhered to the particle reception surface, and forming a monolayer thereon.

According to further features in the described preferred embodiments, a number-averaged aspect ratio (ASPavg) of the plurality of particles is defined by:

$$ASPavg = Lavg/Havg$$

wherein Lavg is a number-averaged long dimension or number-averaged maximum long dimension of the plurality of particles; Havg is a number-averaged characteristic thickness or number-averaged maximum thickness of the plurality of particles; the number-averaged aspect ratio (ASPavg) is at least 1.5:1.

According to still further features in the described preferred embodiments, the plurality of particles have an average long dimension of at most 800 micrometers, the average long dimension being a number-averaged characteristic long dimension or a number-averaged maximum long dimension of the plurality of particles.

According to still further features in the described preferred embodiments, the plurality of particles have a maximum average thickness of at most 1200 nm, the maximum average thickness being a number-averaged thickness or a number-averaged maximum thickness of the plurality of particles.

According to still further features in the described preferred embodiments, the average long dimension is at most 600 micrometers, at most 400 µm, at most 250 µm, at most 150 µm, at most 100 µm, at most 80 µm, at most 60 µm, at most 40 µm, at most 25 µm, at most 20 µm, at most 15 µm, at most 12 µm, at most 10 µm, at most 8 µm, at most 6 µm, at most 4 µm, at most 3 µm, at most 2 µm, at most 1.5 µm, at most 1.2 µm, at most 1.0 µm, at most 0.8 µm, at most 0.7 µm, at most 0.65 µm, or at most 0.6 µm.

According to still further features in the described preferred embodiments, the average long dimension or number-averaged long dimension is at least 0.04 micrometers, at least 0.05 µm, at least 0.06 µm, at least 0.08 µm, at least 0.10 µm, at least 0.12 µm, at least 0.15 µm, or at least 0.20 µm.

According to still further features in the described preferred embodiments, the maximum average thickness or number-averaged maximum thickness is at most 1000 nm, at most 800 nm, at most 600 nm, at most 500 nm, at most 400 nm, at most 350 nm, at most 300 nm, at most 250 nm, at most 200 nm, at most 175 nm, at most 150 nm, at most 125 nm, or at most 100 nm.

According to still further features in the described preferred embodiments, the maximum average thickness or number-averaged maximum thickness is at least 5 nm, at least 7 nm, at least 10 nm, at least 15 nm, at least 20 nm, at least 25 nm, at least 30 nm, at least 40 nm, or at least 50 nm.

According to still further features in the described preferred embodiments, the average or number-averaged aspect ratio (ASPavg) is at least 1.5:1, at least 1.75:1, at least 2:1, at least 2.5:1, at least 3:1, at least 4:1, at least 5:1, or at least 6:1.

According to still further features in the described preferred embodiments, the average or number-averaged aspect ratio (ASPavg) is at least 8:1, at least 10:1, at least 15:1, or at least 20:1, at least 25:1, or at least 30:1.

According to still further features in the described preferred embodiments, the average or number-averaged aspect ratio (ASPavg) of the plurality of particles is at most 100:1, at most 75:1, at most 60:1, at most 50:1, or at most 45:1.

According to still further features in the described preferred embodiments, the average or number-averaged aspect ratio (ASPavg) is at most 40:1, at most 35:1, at most 30:1, at most 25:1, at most 20:1, at most 15:1, at most 12:1, at most 10:1, or at most 7:1.

According to still further features in the described preferred embodiments, the average or number-averaged aspect ratio (ASPavg) is within a range of 1.5:1 to 50:1, 1.5:1 to 30:1, 1.5:1 to 20:1, 1.5:1 to 15:1, 1.5:1 to 10:1, 1.5:1 to 8:1, or 1.5:1 to 6:1.

According to still further features in the described preferred embodiments, the average or number-averaged aspect ratio (ASPavg) is at least 2:1, at least 2.25:1, at least 2.5:1, at least 3:1, at least 3.5:1, or at least 4:1.

According to still further features in the described preferred embodiments, the particles have a hydrophobic surface.

According to still further features in the described preferred embodiments, the particles are non-hydrophobic, and a hydrophobic layer is attached to each of the particles, and at least partially envelops each of the particles.

According to still further features in the described preferred embodiments, the hydrophobic layer is an inorganic hydrophobic layer optionally including an oxide.

According to still further features in the described preferred embodiments, the hydrophobic layer is an organic hydrophobic layer.

According to still further features in the described preferred embodiments, the organic hydrophobic layer includes, mainly includes, or consists essentially of at least one of the group consisting of a fatty acid, an oil and an oily substance.

According to still further features in the described preferred embodiments, the fatty acid, oil, and oily substance have a backbone having a carbon number of at least 6, and optionally, within a range of 6 to 50, 6 to 30, 6 to 24 or 10 to 24.

According to still further features in the described preferred embodiments, the hydrophobic layer has a thickness of at most 15 nm, at most 10 nm, at most 7 nm, at most 5 nm, at most 4 nm, at most 3 nm, at most 2.5 nm, or at most 2 nm.

According to still further features in the described preferred embodiments, the organic content of the particles, by weight, is at most 15%, at most 12%, at most 10%, at most 8%, at most 6%, or at most 4%.

According to still further features in the described preferred embodiments, the monolayer is devoid or substantially devoid of a binder such as a polymeric binder. Such can be assessed or confirmed by various methods readily understood by the skilled person, including chemical methods and physical methods. For instance a monolayer substantially devoid of binder would display by AFM analysis top views with visibly distinct particles, whereas in presence of a binder such shapes would typically be masked, their limits appearing fuzzy, if at all detectable.

Polymeric binder that may be found in metal inks as used in conventional printing technologies are typically hydrophilic for inks formulated in an aqueous carrier. Upon deposition of a metal ink image using such known metal ink compositions, the carrier is eliminated (e.g., evaporated), leaving on the printed substrate a continuous film of binder bridging between adjacent particles and overlying randomly formed arrangements thereof in all three dimensions, generally entrapping the particles and over-coating them. The substantial continuum of polymeric binder so formed, yielding a somewhat continuous film or matrix, in such traditional printed constructions typically prevents or reduces the direct exposure of the surface of the particles to the environment. As binders are present in inks in amounts correlated with the amount of metallic particles and as conventional metallic inks are typically characterized by relatively high metal loadings (e.g., of at least 20 wt. %), polymeric binders generally constitute an important fraction of such inks.

Polymeric binders of conventional inks can belong to a wide variety of chemical families, but are generally selected so that the temperature requested for the ink processing, such as its fixation to a substrate (e.g., by drying, curing, annealing and the like) is compatible with the heat resistance of the substrate. Thus, for instance, a binder of a conventional curable metallic ink will typically undergo curing at temperatures below 150° C., or even below 120° C.

Particle compositions suitable for the present printing method need not comprise a binder (e.g., a polymeric binder). Hence a printed construction obtained according to the present disclosure using such "binder-less" particle compositions is correspondingly devoid or substantially devoid of such binders. The presence of a binder in a printed construction can be optically assessed by microscopy techniques (e.g., confocal microscopy or AFM). As readily understood by a person skilled in the art, a top view of a printed construction comprising a binder will display a distinct continuous topology, whereas in a printed construction according to the present teachings the interstices between adjacent monolayer particles, if any, will be discernible (in absence of an overcoat that may mask such phenomena).

According to still further features in the described preferred embodiments, the monolayer contains at most 20%, at most 15%, at most 10%, at most 5%, binder, at most 3%, or at most 2% of a binder such as a polymeric binder. The percentage of binder in the monolayer can be provided in weight per weight or in volume per volume, depending on the methodology elected by the skilled person to assess such presence.

According to still further features in the described preferred embodiments, the monolayer includes a plurality of particles not adhered to the particle reception surface, the monolayer having at most 50%, at most 40%, at most 35%, at most 30%, at most 25%, at most 20%, at most 15%, at most 10%, at most 7%, at most 5%, at most 3%, or at most 2%, by number, of the particles. Typically, these values are obtained using field of view techniques.

According to still further features in the described preferred embodiments, the monolayer has an optical surface coverage ratio of at least 20%, at least 50%, at least 60%, at least 70%, at least 80%, at least 90%, or at least 95%.

According to still further features in the described preferred embodiments, the monolayer has an optical surface coverage ratio within a range of 20% to 100%, 40% to 100%, 50% to 100%, 60% to 100%, 80% to 100%, or 80% to 95%.

According to still further features in the described preferred embodiments, the adhesive layer is disposed on solely a portion of the image-receiving surface.

According to still further features in the described preferred embodiments, the adhesive layer is disposed on solely a portion of the image-receiving surface according to a pre-defined pattern.

According to still further features in the described preferred embodiments, the monolayer is disposed solely on this portion of the image-receiving surface.

According to still further features in the described preferred embodiments, the print construction further includes an overcoat covering and optionally sealing the monolayer.

According to still further features in the described preferred embodiments, the overcoat may be a colored or uncolored transparent, translucent, or opaque layer. Advantageously, the optional overcoat satisfactorily adheres to the monolayer of particles and/or is compatible with the receptive layer underneath said monolayer. Attachment of the overcoat to the particles can be optionally enhanced by physical treatment of the surface with plasma or corona. In embodiments wherein the receptive layer requires post-impression treatment, the over-coat preferably enables such treatment. If, for example, a particular receptive layer requires final UV-curing following transfer of particles thereupon, an overcoat applied upon the monolayer of particles needs to permit the transmission of the UV radiation necessary to achieve such curing.

According to still further features in the described preferred embodiments, ASPavg is evaluated in a field of view (preferably a representative field of view) containing at least 5 of the particles.

According to still further features in the described preferred embodiments, this representative field of view contains at least 10, at least 15, or at least 20 of the particles.

According to still further features in the described preferred embodiments, this representative field of view contains 5 to 100, 10 to 100, 10 to 50, 15 to 50, or 20 to 50 of the particles.

BRIEF DESCRIPTION OF THE DRAWINGS

Embodiments of the disclosure will now be described, by way of example, with reference to the accompanying drawings, in which:

FIGS. 4A to 4D are details of FIGS. 3A to 3D, respectively, drawn to an enlarged scale;

FIG. 6A is an image captured by FIB-SEM showing a cross-section of a metallized substrate surface produced using a printing system and method of the present disclosure;

FIG. 6B is an image captured by FIB-SEM showing a cross-section of a metallized substrate surface produced using a prior-art offset technology;

FIG. 6C is an image captured by FIB-SEM showing a cross-section of a metallized substrate surface produced using a printing system and method of the present disclosure;

FIG. 6D is an image captured by FIB-SEM showing a cross-section of a metallized substrate surface produced using a prior-art offset technology;

FIGS. 7A and 7B schematically illustrate cross-sections through printed constructions that can be obtained using a printing system and method of the present disclosure; and FIGS. 7C to 7E schematically illustrate cross-sections through printed constructions that might be obtained using known printing methods.

DETAILED DESCRIPTION

The ensuing description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental understanding of the disclosure. For the sake of clarity and simplicity, some objects depicted in the figures may not be drawn to scale.

Overall Description of the Printing System

Figure 1:
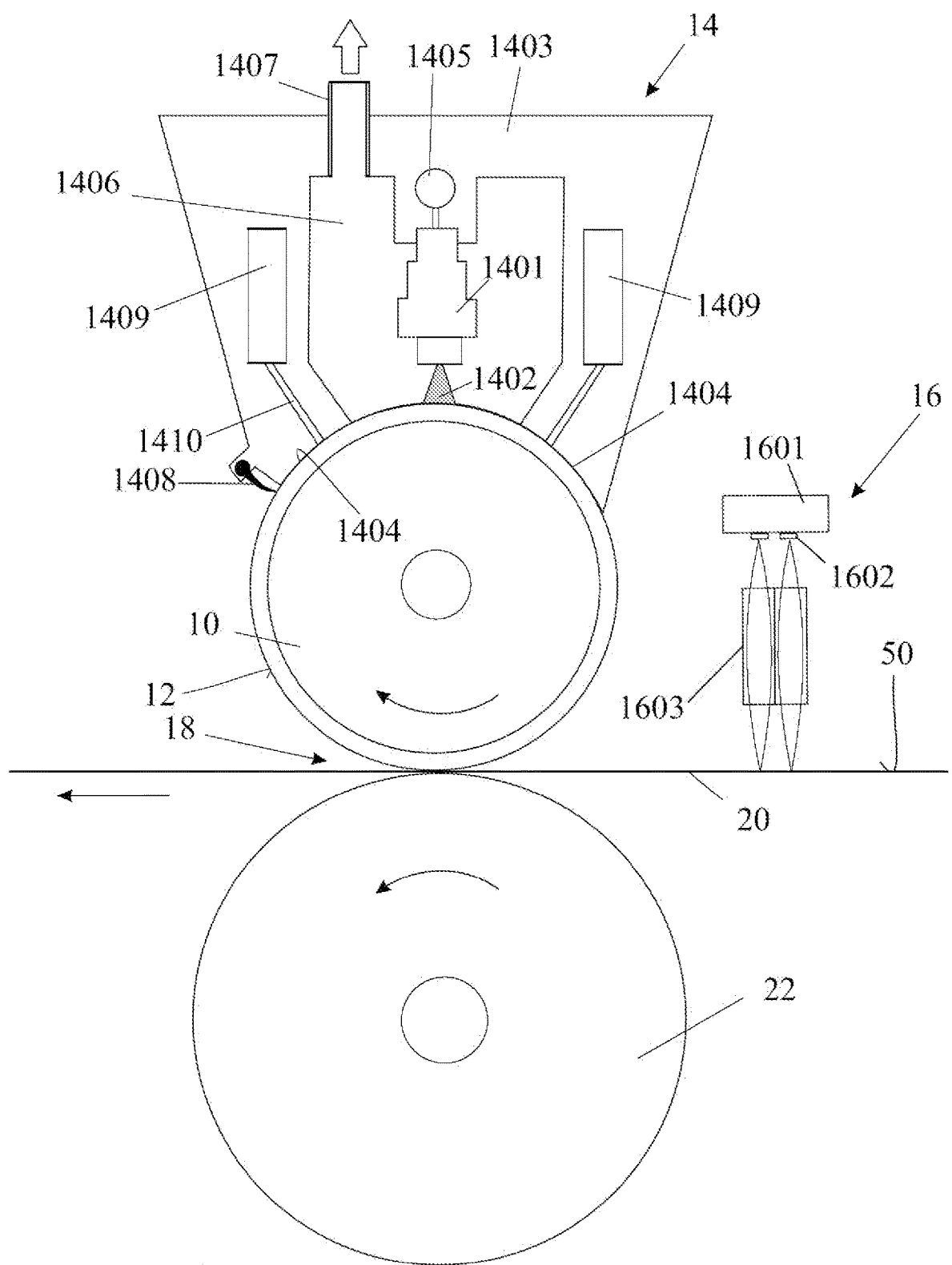
FIG. 1 depicts schematically an embodiment of a printing system of the present disclosure.

FIG. 1 shows a drum 10 having an outer surface 12 that serves as a donor surface. As the drum rotates clockwise, as represented by an arrow, it passes beneath a particle coating apparatus 14 where it acquires a monolayer coating of fine particles. Next, the surface passes through an impression station 18 where a printing substrate 20 is compressed between the drum 10 and an impression cylinder 22. Selected regions 24 of the surface of the printing substrate 20 are rendered tacky, for example in one of the ways described below, prior to coming into contact with the donor surface 12. This causes the monolayer of fine particles to adhere to the tacky regions of the substrate and to separate from the donor surface 12. The side of the printing substrate 20 to which such particles are transferred may be referred to as an image-receiving surface 50. The regions on the donor surface corresponding to the tacky areas or selected regions of the substrate bearing the receptive layer consequently become exposed, being depleted by the transfer of particles. The donor surface 12 then can complete its cycle by returning to the coating apparatus 14 where a fresh monolayer particle coating is applied only to the exposed regions from which the previously applied particles were transferred to the selected regions 24 of the substrate 20 in the impression station 18.

Figure 2:
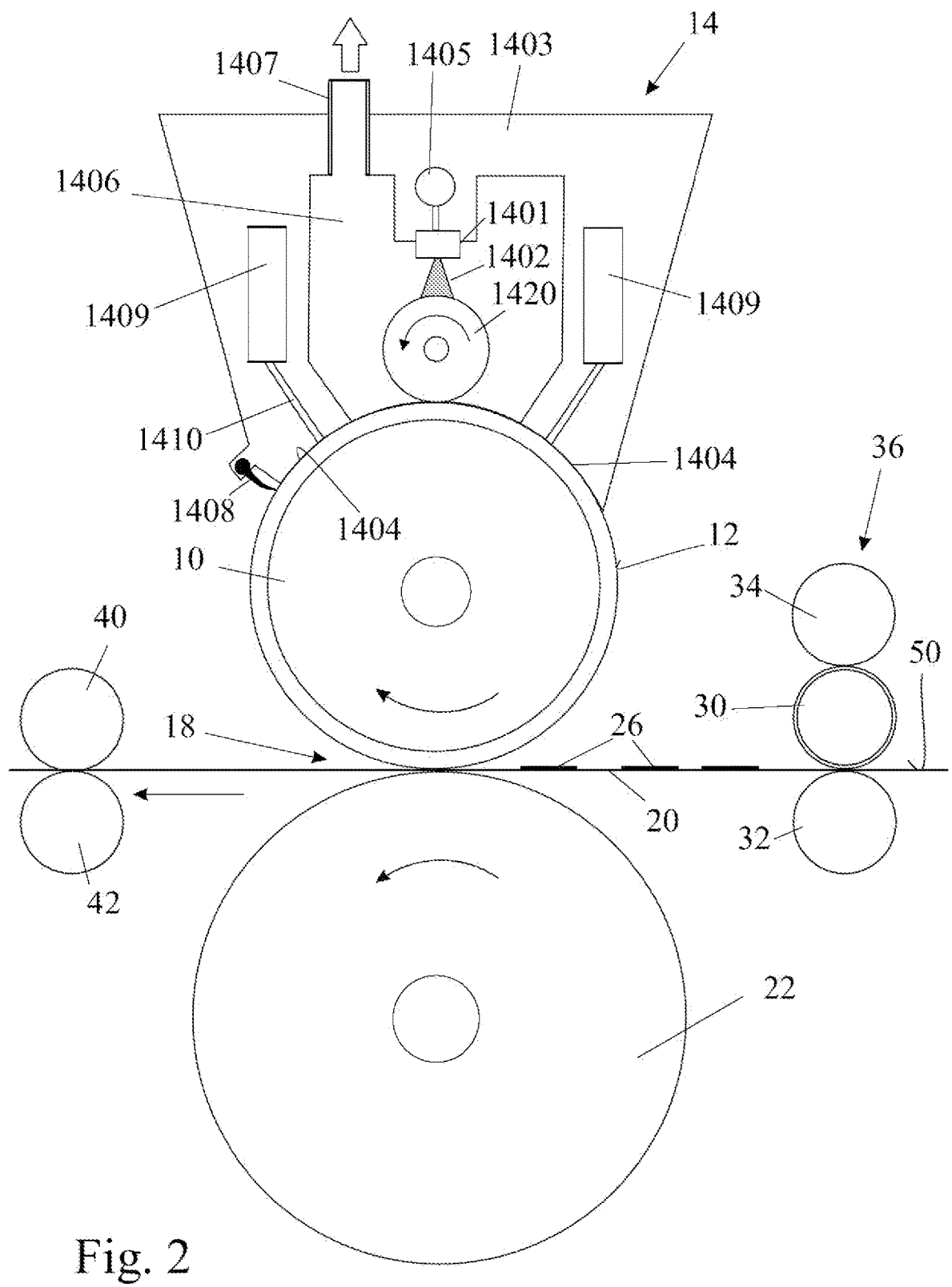
FIG. 2 is a view similar to that of FIG. 1 showing an embodiment having an alternative particle application device.

In the embodiment of FIG. 1, the substrate 20 carries a receptive layer (e.g., made of an adhesive) that is activated and rendered tacky in selected regions 24 by exposure to radiation using as a treating station an imaging system 16, described in greater detail below. In the embodiment of FIG. 2, on the other hand, prior to contacting the donor surface 12, the substrate 20 passes through a treating station 36 between a die 30 and a roller 32. The die 30 has an embossed pattern that picks up an adhesive from an application roller 34 and places receptive layer 26 (e.g., an adhesive layer) on the substrate according to the die pattern. If printing is to cover the entire surface of the substrate 20, the die 30 may be replaced by a plain roller. The rollers 30, 32 and 34 may form additional types of rotating treating stations 36, and can for instance serve for the application and/or activation of a receptive layer by offset, rotogravure, flexography or rotating silkscreen printing. A treating station, as illustrated by imaging system 16 can be referred to as a digital treating station, while a treating station as illustrated by rotating system 36 can be referred to as an analog treating station.

The above examples also illustrate two options for the preparation of the substrate bearing the active (already tacky, with sufficient affinity to the particles) or "activatable" receptive layer or adhesive. In one case, such preparation can occur off-line, the printing system only requiring a substrate transport system able to feed such off-line prepared substrates to the impression station, wherein the activation occurs either downstream of the treating station wherein the receptive layer was applied or at the impression station. In another case, the addition of the receptive layer to the substrate or its activation can occur in-line with the other steps of the printing process.

Additional methods for selectively applying or activating an adhesive or any other type of receptive layer on a printing substrate are known, may be applicable as will be clear to the person skilled in the art and need not be detailed herein, the two aforementioned methods being non-limiting examples. For instance, the receptive layer can be applied at the treating station by silkscreen printing, and optionally further activated at a downstream activation station, preceding the impression station. Activation can for example involve curing of the receptive layer prior to the contacting of the particles. In some embodiments, curing (or further curing) may also serve as a post-transfer processing step (e.g., improving the immobilization of the particles on a curable receptive layer on the substrate).

The Particle Coating Apparatus

The particle coating apparatus 14 in the embodiment of FIG. 1 comprises a plurality of spray heads 1401 that are aligned with each other along the axis of the drum 10 and only one is therefore seen in the section of the drawing. The sprays 1402 of the spray heads are confined within a bell housing 1403, of which the lower rim 1404 is shaped to conform closely to the donor surface leaving only a narrow gap between the bell housing 1403 and the drum 10. The spray heads 1401 are connected to a common supply rail 1405, which supplies to the spray heads 1401 a pressurized fluid carrier (gaseous or liquid) having suspended within it the fine particles to be used in coating the donor surface 12. If needed the particles may be regularly or constantly mixed, in particular before their supply to the spray head(s). The particles may for instance be circulated in the coating apparatus within a flow rate range of 0.1 to 10 liter/minute, or in the range of 0.3 to 3 liter/min. The fluid and the surplus particles from the sprays heads 1401, which are confined within a plenum 1406 formed by the inner space of the housing 1403, are extracted through an outlet pipe 1407, which is connected to a suitable suction source represented by an arrow, and can be recycled back to the spray heads 1401.

It is important to be able to achieve an effective seal between the housing 1403 and the donor surface 12, in order to prevent the spray fluid and the particles from escaping through the narrow gap that must essentially remain between the housing 1403 and the donor surface 12 of the drum 10. Different ways of achieving such a seal are shown schematically in the drawing.

The simplest form of seal is a wiper blade 1408. Such a seal makes physical contact with the donor surface and could score the applied coating if used on the exit side of the housing 1403, that is to say the side downstream of the spray heads 1401. For this reason, if such a seal is used, it is preferred for it to be located only upstream of the spray heads 1401 and/or at the axial ends of the housing 1403. The terms "upstream" and "downstream" as used herein are referenced to points on the donor surface 12 as it passes through the coating station.

FIG. 1 also shows how egress of the fluid within which the particles are suspended from the sealing gap between the housing 1403 and the drum 10 can be prevented without a member contacting the donor surface 12. A gallery 1409 extending around the entire circumference of the housing 1403 is connected by a set of fine passages 1410 extending around the entire rim of the housing 1403 to establish fluid communication between the gallery 1409 and the sealing gap.

In a first embodiment, the gallery 1409 is connected to a suction source of a surplus extraction system, which may be the same suction source as is connected to the outlet 1407 or a different one. In this case, the gallery 1409 serves to extract fluid passing through the gap before it exits the housing 1403. The low pressure also sucks off the drum 10 any particles that are not in direct contact with the donor surface 12 and, if the sprayed fluid is a liquid, it also sucks off surplus liquid to at least partially dry the coating before it leaves the particle coating apparatus 14.

Surplus liquid can alternatively and additionally be removed by mean of a liquid extracting roller (not shown in the figures) positioned on the exit side of the coating apparatus. Such a roller, the surface of which having sponge-like liquid absorbing properties (e.g., closed cell foam), can be independently driven to rotate at a speed and/or in a direction differing from the speed and direction of drum 10. The liquid extracting roller can contact the particles coated on the donor surface 12 and extract surplus liquid by drawing it within its fluid absorbing outer surface, advantageously sufficiently smooth and even so as not to affect the layer of particles retained on the donor surface prior to their selective transfer to the substrate 20, when needed. As the extracting roller continues to rotate following the absorption of the surplus liquid, it approaches a wiper or any other suitable mean positioned so as to squeeze the roller and release the extracted liquid out of its absorbing surface. A suction inlet can be positioned adjacent to such scrapper, so as to permit the immediate removal of the liquid so extracted from the particle coated donor surface and so forced out of the roller outer surface. Following such elimination of the removed liquid, the roller can complete its cycle, contacting again the donor surface and further extracting surplus liquid.

As mentioned, the printing system may further comprise a dryer (e.g., hot or cold air blower) on the exit side of the coating apparatus 14, or further downstream, so as to allow the particle coat to reach a subsequent station in substantially dry form.

In an alternative embodiment, the gallery 1409 is connected to a source of gas at a pressure higher than the pressure in the plenum 1406. Depending on the rate of fluid supply to the plenum through the spray heads 1401 and the rate of extraction through the outlet 1407, the plenum 1406 may be at a pressure either above or below the ambient atmospheric pressure.

If the plenum is at sub-atmospheric pressure, then is suffices for the gallery 1409 to be at ambient atmospheric pressure, or the gallery may be omitted altogether. In this case, because the pressure within the sealing gap will exceed the pressure in the plenum 1406, gas flow through the gap will be towards the interior of the housing with no risk of fluid egress.

If the plenum is at above atmospheric pressure, then the gallery 1409 may be connected to a pressurized gas supply, preferably air. In this case, air will be forced into the sealing gap under pressure through the passages 1410 and will split into two streams. One stream will flow towards the plenum 1406 and will prevent egress of the fluid within which the particles are suspended. That stream will also dislodge and/or entrain particles not in direct contact with the donor surface and assist in drying the coating if the carrier fluid is a liquid. The second stream will escape from the coating apparatus without presenting a problem as it is only clean air without any suspended particles. The second gas stream may also assist in further drying of the particle coating on the donor surface 12 before it leaves the coating apparatus 14. If desired, the gas stream can be heated to facilitate such drying.

In an alternative embodiment, the afore-mentioned gallery 1409 does not extend around the entire circumference of the housing, so as to seal the plenum 1406 on all sides. It can be a "partial" gallery or a combination of one or more air knives (with negative or positive flow) positioned either downstream or upstream of the spray head(s) and/or intermediate applicator(s) in parallel to the axis of the drum and/or on the lateral edges of the spray heads and/or applicator(s) in a direction perpendicular to the axis of the drum. A "partial" gallery on the exit side may, in some embodiments, serve as gas blower (e.g., cold or hot air) additionally or alternatively facilitating the drying of the particles, in which case the passages 1410 may be adapted to provide sufficient flow rate.

In the embodiment illustrated in FIG. 2, instead of being carried in a fluid sprayed directly onto the donor surface 12, the suspended particles are being applied to an intermediate applicator 1420. The applicator 1420 may be for example a sponge-like roller, of which the axis is parallel to the axis of drum 10. The fluid and suspended particles may be sprayed onto the applicator 1420 in the manner shown in FIG. 2, or if the applicator is porous, or constructed in manner similar to the "brushes" used in automatic car washes that have loose fabric strips extending radially from a central axle, then the fluid may be introduced via the axle hub and allowed to escape through holes in the axle (not shown). The material of the roller or the fabric strip is to be "relatively soft", selected so as to wipe the particles on the surface, without affecting the integrity of the coat thereupon formed, in other words without scratching the layer of particles. The surface of the applicator, or of its bristles or stripes, may suitably comprise a closed-cell foam (such as such as closed cell polyethylene, closed cell PVA or closed cell silicone); or a relatively soft open cell foam (such as a polyurethane foam); or a fabric, such as cotton, silk or ultra high molecular weight polyethylene (UHMWPE) fabric.

As the roller or brush 1420 rotates along its axis, it applies the particles upon contact with donor surface 12 of drum 10. The outer surface of the applicator 1420 need not have the same linear velocity as the donor surface and it can, for instance, be up to about ten-fold higher. It may rotate in the same direction as drum 10 or in counter-direction. The applicator may be independently driven by a motor (not shown), or driven by drum 10, by gears, belts, friction, and the like.

The particle coating apparatus 14 may comprise more than one applicator of particles, e.g., two or three applicators, as illustrated by roller 1420. Each such applicator may additionally have its own supply of particles. Such applicator(s) may optionally provide some burnishing or flattening of the particles on the donor surface, or such function, if desired, can be provided by a separate element, such as roller 40 described below.

The coating apparatus can also further comprise a cleaning roller (not shown). A cleaning roller can be similar in structure to an applicator roller, except that it would lack the supply of particles. A cleaning roller may for instance apply a liquid corresponding to the fluid carrier of the particles, but depleted of the latter.

The Particles

The shape and composition of the coating particle will depend in practice on the nature of the effect to be applied to the surface of the substrate 20. In a printing system seeking to achieve effects similar to foil printing, the particles may conveniently be formed of a metallic or metal-looking material. For printing of high quality, it is desirable for the particles to be as fine as possible to minimize the interstices between particles of the applied monolayer coating. The particle size is dependent upon the desired image resolution and for some applications a particle size (e.g., a diameter or longest dimension) of 10 µm (micrometers) or possibly even more (i.e. having a larger size) may prove adequate. The longest dimension of irregular platelets may even reach 100 µm on average. However, for improved image quality, it is preferred for the particle size to be a small fraction or a fraction of a micrometer and more preferably a few tens or hundreds of nanometers. Commercially available flakes may have a thickness of about 60-900 nm and a representative planar dimension (e.g., mean diameter for near round flakes or average "equivalent diameter" for platelets having less regular plane projection, also characterized by shortest/longest dimensions) of about 1-5 µm, but flakes can also be prepared with a thickness of as little as 15 nm, 20 nm, 25 nm, 30 nm, 40 nm, or 50 nm and a mean or equivalent diameter in the region of 100-1000 nm or 500-800 nm. When metal-looking particles are used, it is believed that over most of the practical size range, the smaller the particle size, the greater is the degree of shine that can be achieved and the closer one can approximate to a mirror-like finish when such particles have substantially the same orientation (e.g., when flake-like particles are to a large extent aligned with one another, so as to form a relatively even surface enhancing specular light reflection). However, the size of the particles need not be too small, since below a certain threshold, which typically depends on the chemical and/or physical nature of the particles, the particles may display undesired edge effects, rendering them less suitable to the intended printing. Thus ideal size determination, which may depend upon the intended visual effect as well as other printing parameters (e.g., substrate and/or receptive layer roughness) or operating parameter of the printing system (e.g., impression pressure or burnishing shear and like factors), may be done empirically, by routine experimentation, by one of ordinary skill in the printing art.

Particles of metallic and metal-looking materials may be used to achieve either a matte or a glossy look, and any intermediate look, once transferred to the printing substrate. Such look may, to some extent, be subsequently modified by additional steps (e.g., burnishing, varnishing, etc.)

Depending on their shape, which can be relatively regular or irregular, the particles may be characterized by their length, width, thickness, mean or equivalent diameter or any such representative measurement of their X-, Y- and Z-dimensions. Generally the dimensions of the particles are assessed on planar projections of their shape (e.g., vertical and/or horizontal projections). Typically such sizes are provided as average of the population of particles and can be determined by any technique known in the art, such as microscopy and Dynamic Light Scattering (DLS). In DLS techniques the particles are approximated to spheres of equivalent behavior and the size can be provided in term of hydrodynamic diameter. DLS also allows assessing the size distribution of a population. As used herein, particles having a size of, for instance, 10 μm or less, have at least one dimension smaller than 10 μm, and possibly two or even three dimensions, depending on shape. The particles are said to fulfill on average any desired size preference, if the D50 (up to 50% of the population) is about the intended size; whereas a population of particles wherein the D90 is about the intended size implies a vast majority of particles (up to 90% of the population) satisfy the same.

Though not essential, the particles may preferably be uniformly shaped and/or within a symmetrical distribution relative to a median value of the population and/or within a relatively narrow size distribution.

A particle size distribution is said to be relatively narrow if at least one of the two following conditions applies:
A) the difference between the hydrodynamic diameter of 90% of the particles and the hydrodynamic diameter of 10% of the particles is equal to or less than 150 nm, or equal to or less than 100 nm, or even equal to or less than 50 nm, which can be mathematically expressed by: (D90−D10)≤150 nm and so on; and/or
B) the ratio between a) the difference between the hydrodynamic diameter of 90% of the particles and the hydrodynamic diameter of 10% of the particles; and b) the hydrodynamic diameter of 50% of the particles, is no more than 2.0, or no more than 1.5, or even no more than 1.0, which can be mathematically expressed by: (D90−D10)/D50≤2.0 and so on.

The particles may have any suitable aspect ratio, i.e., a dimensionless ratio between the smallest dimension of the particle and the equivalent diameter in the largest plane orthogonal to the smallest dimension. The equivalent diameter can be for instance the arithmetical average between the longest and shortest dimensions of that largest orthogonal plane. Such dimensions are generally provided by the suppliers of such particles and can be assessed on a number of representative particles by methods known in the art, such as microscopy, including in particular by scanning electron microscope SEM (preferably for the planar dimensions) and by focused ion beam FIB (preferably for the thickness and length (long) dimensions). Particles having an almost spherical shape are characterized by an aspect ratio of approximately 1:1, whereas flake-like particles can have an aspect ratio (i.e. between the average of the longest lengths of planar projections of the particles or of their mean or equivalent diameters, as the case may be, and the average thickness of the particles) of 100:1 or more. Though not limiting, the particles according to the present teachings can have an aspect ratio (or average aspect ratio) of about 100:1 or less, of about 75:1 or less, of about 50:1 or less, of about 25:1 or less, of about 10:1 or less, or even of about 2:1 or less. In some embodiments, the particles according to the present teachings may have an aspect ratio (or average aspect ratio) of at least 2:1, at least 3:1, at least 5:1, at least 10:1, at least 25:1, at least 40:1, or at least 70:1. In some embodiments, the particles according to the present teachings may have an aspect ratio (or average aspect ratio) within a range of 2:1 to 500:1, 4:1 to 500:1, 8:1 to 500:1, 10:1 to 500:1, 10:1 to 100:1, 20:1 to 500:1, 20:1 to 300:1, 20:1 to 250:1, 20:1 to 200:1, or 20:1 to 100:1. Particles having an aspect ratio (or average aspect ratio) of at least 10:1 are generally considered as platelets, a population of particles including at least 50% by number of such particles being said to mainly include platelets, while a population including at least 70% by number of such particles is said to predominantly include platelets.

In these embodiments, the (overall, or average) aspect ratio for a group of particles may be volume-averaged, surface-area averaged, or number averaged.

In some embodiments, the aspect ratios of representative particles may be estimated by SEM techniques and/or by SEM-FIB techniques, as described in further detail herein. While selecting a representative particle, or a group of representative particles, that may accurately characterize the aspect ratio of the population, it will be appreciated that a more statistical approach may yet more accurately characterize the aspect ratio of particles within the population. Thus, in some embodiments of the present disclosure, the aspect ratio of the particles may be determined by analyzing, in its entirety, a representative field of view of the image-capturing instrument (e.g., SEM). Typically, the magnification is adjusted such that at least 5 particles, at least 10 particles, at least 20 particles, or at least 50 particles are disposed within a single field of view. As above, the (overall, or average) aspect ratio for a group of particles may be volume-averaged, surface-area averaged, or number averaged.

As used herein in the specification and in the claims section that follows, the term "aspect ratio", or "particular aspect ratio" refers to the dimensionless ratio between the smallest dimension of the particle and the equivalent diameter in the largest plane orthogonal to the smallest dimension.

As used herein in the specification and in the claims section that follows, the term "equivalent diameter" refers to the arithmetical average between the longest and shortest dimensions of that largest orthogonal plane.

As used herein in the specification and in the claims section that follows, the term "average aspect ratio" or "overall aspect ratio" refers to the aspect ratio of a plurality of particles, each having a particular aspect ratio.

In particular, and as used in independent claim 1, a number-averaged aspect ratio (ASPavg) of a plurality of particles may be defined by:

$$ASPavg = Lavg/Havg$$

wherein Lavg is a number-averaged long dimension of the plurality of particles, and wherein Havg is a number-averaged maximum thickness of the plurality of particles.

As used herein in the specification and in the claims section that follows, "number averaged" values are averaged values in which the value for each individual particle is assigned the identical weighting, irrespective of particle size.

As used herein in the specification and in the claims section that follows, the term "maximum thickness", at least within the context of a "number-averaged maximum thickness", refers to a maximum thickness of a particle in its narrow direction, as viewed in a field of view of an image-capturing instrument such as SEM-FIB.

As used herein in the specification and in the claims section that follows, the term "long dimension", at least within the context of a "number-averaged long dimension", refers to the maximum long dimension of a particle as viewed in a field of view of an image-capturing instrument such as SEM-FIB, the maximum long dimension being orthogonal to the line of maximum thickness for that particle.

In addition to their impact on the visual effect to be imparted, the particles may have shapes and/or dimensions suitable to provide for sufficient contact area with the donor surface, and subsequently with the desired substrate regions (e.g., on a receptive layer), at least over a time period the visual effect is desired or until an overcoat is applied.

Depending on their composition and/or on the processes they undergo (e.g., milling, recycling, burnishing, etc.), the particles can be hydrophobic with different degrees, if any, of hydrophilicity. As the balance between the hydrophobic and hydrophilic nature of the particles may shift with time, the process is expected to remain efficient if the hydrophobic nature of the particles predominates. Additionally, the particles may be made of materials intrinsically hydrophilic, in which case they can be rendered hydrophobic by application of a particle coating. Materials suitable for such a particle coating can have a hydrophilic end with affinity to the particle (e.g., a carboxylic function affine to a metal oxide) and a hydrophobic tail. In the present disclosure such particles, whether intrinsically hydrophobic or coated to become hydrophobic or more hydrophobic, are said to be substantially hydrophobic.

In one embodiment, the particles are of aluminum and are coated with a carboxylic acid that renders the particles hydrophobic, reduces their ability to stick to one another and reduces their oxidation. The hydrophobicity of such particles when coated with stearic acid was estimated by measuring the contact angle formed by a droplet of deionized water, according to the method described in more details for the donor surface. Such coated particles displayed a wetting angle of 130.1+6°. However, particles having any wetting angle exceeding 90° can be suitable.

The hydrophobicity of the particles may be a known property inherent to their chemical composition. If needed, the degree of hydrophobicity or hydrophilicity can be assessed by measurement of the contact angle of a droplet of reference liquid (typically deionized water) on a sizeable surface of the bulk material forming the particles or of their coat, as applicable. Those of skill in the art will readily appreciate that a contact angle may be used to characterize a degree of hydrophilicity or hydrophobicity, according to standard techniques. A contact angle above 90° may indicate a hydrophobic surface, while a contact angle below this value may be indicative of a hydrophilic surface. Additionally, hydrophobicity may be assessed at the scale of the particles by introducing a predetermined amount of the particles to deionized water. Hydrophobic particles will display a leafing behavior, migrating towards the air interface, while hydrophilic particles will exhibit a non-leafing pattern, allowing them to maintain a fairly random distribution in the water carrier. Such phase separation, or lack thereof, can be facilitated by the addition of a non-water miscible oil phase, in which case the hydrophobic particles migrate towards the oil phase, while hydrophilic particles tend to remain in the aqueous phase. Determination of the concentration of particles in the initial water sample and in the final separated phases, the phase separation being typically performed three times for a given sample, allows assessing the hydrophobic or hydrophilic behavior of the particles. Additional methods can be used, such as surface adsorption assays using a known proportion of Rose Bengal dye per the amount of particles to be tested. The dye adsorbs on hydrophobic surface of particles as a function of their surface area. The unbound dye remaining in the aqueous phase can be measured by spectrophotometry, providing an estimate of the bound amount commensurate with the hydrophobicity of the particles. The relative hydrophobicity can be determined by calculating the Partition Quotient of the dye between the amount absorbed and the unbound amount. Similarly, Nile Blue dye can be used to determine the hydrophilicity of the particles surface. Additional methods are known and can be suitable. As used herein, the term "hydrophobic" and the like is used for particles and materials that exhibit hydrophobicity according to at least one (and preferably at least two or three) of the above-described characterization methods.

The particles can be carried by either a gaseous or a liquid fluid when they are sprayed onto the donor surface or upon the intermediate applicator(s). When the particles are suspended in a liquid, in order both to reduce cost and minimize environmental pollution, it is desirable for the liquid to be aqueous. In such a case, it is desirable for the material used to form or coat the particles to be hydrophobic. Hydrophobic particles more readily separate from an aqueous carrier, facilitating their tendency to attach to and coat the donor surface. Such preferential affinity of the particles towards the donor surface of the coating device, rather than towards their carrier and towards one another, is deemed particularly advantageous. Blowing a gas stream over the particle coating (which as mentioned can preferably be formed by hydrophobic particles on an hydrophobic surface) will both serve to dislodge and/or entrain particles not in direct contact with the donor surface and to at least partially dry the coating on the donor surface.

When applying to the substrate 20 an effect similar to foil imaging, the particles may be, as mentioned, metallic or more generally metal-looking and may be coated or uncoated. Because of the manner in which such particles are produced (commonly by milling), they tend to be flat platelets and though not essential this enables highly reflective coatings of near mirror quality to be achieved when the particles have light reflective surfaces and their planar dimension are substantially aligned with the surface of the substrate. Such particles lend themselves to burnishing, which may be carried our either by the use of high pressure during the spraying or by means of a burnishing roller, such as the optional roller 40 and counter roller 42 shown in FIG. 2.

In addition, or as an alternative, to burnishing the particle layer after it has been transferred to the substrate, it is possible to burnish it while it is still on the donor surface 12. Thus, a burnishing roller or other wiping element may be positioned immediately downstream or as part of the coating apparatus 14.

Burnishing may be carried out with a dry roller or with a wet roller (e.g., impregnated and/or washed with the fluid on which the particles are suspended, for instance water). In the event that an intermediate applicator is used, it cannot be ruled out that it may, in addition to applying the particles to the surface, also at least partly burnish them. It is believed that during burnishing, the size of the particles is reduced as compared to their original size upon initial injection into the coating apparatus, and that, alternatively and additionally, the burnished particles are oriented in a substantially parallel manner with respect to the donor surface.

The outer surface of the optional burnishing roller may rotate at a linear speed different than that of the donor surface of the drum and/or of the outer surface of an intermediate applicator, if present. It can rotate in the same or counter-direction relative to the drum.

The Particle Carrier

The particle carrier, that is to say the fluid within which the particles are suspended, may be either a liquid or a gas. If liquid, the carrier is preferably water based and if gaseous the carrier is preferably air. The particles may be lyophobic (i.e., having no affinity) with respect to their carrier, for instance may be hydrophobic, while the carrier is an aqueous liquid. Such may result in particles being partly dispersed in the liquid, and partly phase separated (all types of such mixtures of materials of same or different phases being herein encompassed by the term "suspended"). In addition to the particles, the carrier may comprise any additive known in the art of particle formulation, such as dispersants, surfactants, water-miscible solvents, co-solvents, stabilizers, preservatives, viscosity modifiers, pH modifiers, and the like. All such additives and their typical concentrations are known to persons skilled in the art of dispersions and need not be further detailed herein. Additives (or mixtures thereof) not affecting the hydrophobicity of the particles and of the donor surface are preferred. Such agents, in particular the dispersing agents, may assist in maintaining or increasing the stability of the suspended particles in the liquid (including in phase separated form, if desired). The liquid carrier may also comprise excess of unbound material serving as particle coat, if desired when applicable. Any such additive and mix thereof, preferably do not affect the overall inertness of the liquid carrier towards the donor surface (e.g., avoiding or reducing any deleterious swelling of the surface that would prevent proper coating by/attachment of the particles).

A liquid carrier is said to be aqueous if it contains at least 80 wt. % water (i.e., 80% by weight of the total composition), or at least 85 wt. %, or at least 90 wt. %, or at least even 95 wt. % water. It is to be understood that though final work aqueous compositions may predominantly contain water, as previously mentioned, it is possible to prepare intermediate aqueous compositions containing a higher amount of solid particles (and additives if any) and lower amount of water. Such intermediate compositions may serve as concentrates, which can be diluted to desired working concentrations when needed, but stored and/or shipped in smaller volumes. A concentrate may for instance comprise as much as about 80 wt. % of solids and about 20 wt. % of a water miscible co-solvent, the water being added during dilution of the concentrate.

The Donor Surface

The donor surface 12 in some embodiments is a hydrophobic surface, made typically of an elastomer that can be tailored to have properties as herein disclosed, generally prepared from a silicone-based material. Poly(dimethylsiloxane) polymers, which are silicone-based, have been found suitable. In one embodiment, a fluid curable composition was formulated by combining three silicone-based polymers: a vinyl-terminated polydimethylsiloxane 5000 cSt (DMS V35, Gelest, CAS No. 68083-19-2) in an amount of about 44.8% by weight of the total composition (wt. %), a vinyl functional polydimethyl siloxane containing both terminal and pendant vinyl groups (Polymer XP RV 5000, Evonik Hanse, CAS No. 68083-18-1) in an amount of about 19.2 wt. %, and a branched structure vinyl functional polydimethyl siloxane (VQM Resin-146, Gelest, CAS No. 68584-83-8) in an amount of about 25.6 wt. %. To the mixture of the vinyl functional polydimethyl siloxanes were added: a platinum catalyst, such as a platinum divinyltetramethyldisiloxane complex (SIP 6831.2, Gelest, CAS No. 68478-92-2) in an amount of about 0.1 wt. %, an inhibitor to better control curing conditions, Inhibitor 600 of Evonik Hanse, in an amount of about 2.6 wt. %, and finally a reactive cross-linker, such as a methyl-hydrosiloxane-dimethylsiloxane copolymer (HMS 301, Gelest, CAS No. 68037-59-2) in an amount of about 7.7 wt. %, which initiates the addition curing. This addition curable composition was shortly thereafter applied with a smooth leveling knife upon the support of the donor surface (e.g., an epoxy sleeve mountable on drum 10), such support being optionally treated (e.g., by corona or with a priming substance) to further the adherence of the donor surface material to its support. The applied fluid was cured for two hours at 100-120° C. in a ventilated oven so as to form a donor surface.

The hydrophobicity is to enable the particles exposed to selective stripping by the tacky film created on the receptive layer bearing substrate to transfer cleanly to the substrate without splitting.

The donor surface should be hydrophobic, that is to say the wetting angle with the aqueous carrier of the particles should exceed 90°. The wetting angle is the angle formed by the meniscus at the liquid/air/solid interface and if it exceeds 90°, the water tends to bead and does not wet, and therefore adhere, to the surface. The wetting angle or equilibrium contact angle $\Theta_0$, which is comprised between and can be calculated from the receding (minimal) contact angle $\Theta_R$ and the advancing (maximal) contact angle $\Theta_A$, can be assessed at a given temperature and pressure of relevance to the operational conditions of the process. It is conventionally measured with a goniometer or a drop shape analyzer through a drop of liquid having a volume of 5 µl, where the liquid-vapor interface meets the solid polymeric surface, at ambient temperature (circa 23° C.) and pressure (circa 100 kPa). Contact angle measurements can for instance be performed with a Contact Angle analyzer—Krüss™ "Easy Drop" FM40Mk2 using distilled water as reference liquid.

Such measurements were performed on a sample of donor surface prepared as above described, the sample having a size of 2 cm×2 cm. The results were analyzed using "Drop shape analysis" program, circle computer method, the advancing contact angle $\Theta_A$ of the above-described donor surface was found to be 101.7°±0.8° and the receding contact angle $\Theta_R$ was found to be 99.9°±3.1°. Typically, donor surfaces prepared by this method had contact angles in the range of about 95° to about 115°, generally not exceeding 110°.

This hydrophobicity may be an inherent property of the polymer forming the donor surface or may be enhanced by inclusion of hydrophobicity additives in the polymer composition. Additives that may promote the hydrophobicity of a polymeric composition may be, for example, oils (e.g., synthetic, natural, plant or mineral oils), waxes, plasticizers and silicone additives. Such hydrophobicity additives can be compatible with any polymeric material, as long as their respective chemical nature or amounts do not prevent proper formation of the donor surface, and for instance would not impair adequate curing of the polymeric material.

The roughness or finish of the donor surface will be replicated in the printed metallized surface. Therefore if a mirror finish or highly glossy appearance is required, the donor surface would need to be smoother than if a matte or satin look is desired. These visual effects can also be derived from the roughness of the printing substrate and/or of the receptive layer.

The donor surface may have any Shore hardness suitable to provide a strong bond to the particles when they are applied using the coating apparatus 14, the bond being stronger than the tendency of the particles to adhere to one another. The hardness of the silicone-based surface may vary and for instance depend on the thickness of the donor surface and/or the particles intended to be bond. It is believed that for relatively thin donor surfaces (e.g., 100 μm or less), the silicone-based material may have a medium to low hardness; whereas for relatively thick donor surfaces (e.g., up to about 1 mm), the silicone-based material may have a relatively high hardness. Additionally, larger particles may typically benefit from a donor surface having a lower hardness than necessary to accommodate relatively smaller particles. In some embodiments, a relatively high hardness between about 60 Shore A and about 80 Shore A is suitable for the donor surface. In other embodiments, a medium-low hardness of less than 60, 50, 40, 30 or even 20 Shore A is satisfactory.

The donor surface 12 in the drawings is the outer surface of a drum 10 but this is not essential as it may alternatively be the surface of an endless transfer member having the form of a belt guided over guide rollers and maintained under an appropriate tension at least while it is passing through the coating apparatus.

The donor surface may additionally address practical or particular considerations resulting from the specific architecture of the printing system. For instance, it can be flexible enough to be mounted on a drum, have sufficient abrasion resistance, be inert to the particles and/or fluids being employed, and/or be resistant to any operating condition of relevance (e.g., pressure, heat, tension, etc.). Fulfilling any such property tends to favorably increase the life-span of the donor surface.

The Treating Station

As mentioned, numerous ways of applying a receptive layer (e.g., an adhesive or activatable adhesive) pattern to a printing substrate are known, especially in conventional non-digital printing systems as discussed in relation with the possible alternative analog treating stations 36 schematically illustrated in FIG. 2. The imaging system 16 schematically illustrated in FIG. 1 provides one way of selecting the regions on the substrate where the particle coating applied to the donor surface 12 that will transfer to the substrate 20 at the impression station. Such an imaging system is required in the implementation of a digital treating station for a digital printing system.

An exemplary imaging system 16 may comprise a support 1601 carrying an array of laser sources such as VCSEL (Vertical Cavity Surface Emitting Laser) chips 1602 that are optionally arranged in pair(s) of rows in positions that are accurately predetermined and staggered relative to one another. The support 1601 may be fluid cooled to cope with the significant heat that may be generated by the chips. Laser beams emitted by the chips 1602 are focused by lenses 1603 constructed as corresponding pair(s) of rows of GRIN (Gradient-Index) rod lenses (each chip 1602, and all laser elements thereupon, being associated with a corresponding focusing lens 1603). Signals supplied to the chips for the activation of one or more laser element are synchronized with the movement of the substrate 20 towards the impression station 18 in the direction of the illustrated arrow by a transport system (not shown in FIG. 1). The effect of the irradiation of each pixel by a laser beam is to convert an inactive receptive layer on the substrate 20 at that pixel into a tacky state (activating the receptive film) so that said pixel may later adhere to the particles coating the donor surface 12. In other words, such irradiation mediated activation of the receptive layer provides on the substrate selected areas 24 having more affinity towards the particles than the particles have with the donor surface, the activated areas thus being able to selectively detach particles from the donor surface 12 and retain them on the substrate according to a same selected pattern.

If used for color printing, the systems shown in FIGS. 1 and 2 can only print in one color but multicolor printing can be achieved by passing the same substrate successively through multiple towers that are synchronized with one another and each printing a different color. Alternatively, and additionally, different colors can be obtained by applying a colored transparent overcoat (or a partial foreground image) above particles having a sufficiently light shade. For instance, a "gold" look can be achieved by overprinting a yellow-orange tint over "silver" looking aluminum particles.

The Substrate

The printing system shown in the drawing is not restricted to any particular type of substrate, as long as the particles have higher affinity towards the donor surface than to the bare substrate (i.e., in areas lacking a suitable receptive layer). The substrate may be individual sheets of paper or card or it may have the form of a continuous web. The substrate can also be made of a fabric or of leather. Because of the manner in which the particles are applied to the substrate, the particles tend to reside on the surface of the substrate. This allows printing of high quality to be achieved on paper of indifferent quality. Furthermore, the material of the substrate need not be fibrous and may instead be any type of surface, for example a plastics film or a rigid board.

As previously explained, the substrate may also have any desired roughness adapted to the desired look, though such intended effect can also be modulated at the level of the receptive layer.

It should be recalled that some printing substrates may be supplied in coated or uncoated forms, or be otherwise pre-treated to facilitate their intended use. For instance, a substrate may be coated with a priming material that may enhance the later adhesion of a receptive layer to the substrate, or enable any other like step the substrate may be subjected to. In the present specification, the term "substrate" is to be understood in its broadest sense, irrespective of form, material and coating(s) or lack thereof, as a physical support to an image to be or having been printed, in particular able to bear the particles to be transferred thereupon.

The Impression Station

The illustrated impression station 18 comprises only a smooth impression cylinder 22 that is pressed against the drum 10 and its outer donor surface 12. The impression cylinder 22 may form part of a substrate transport system, in which case it may be equipped with grippers for engaging the leading edge of individual substrate sheets. Alternatively, the impression cylinder may bear a shape serving to further emboss the printing substrate to which the particles are being transferred. Further, the impression station may have a second donor surface disposed to transfer particles on the opposite side of the substrate, allowing double-sided printing.

Exemplary Print-Outs

FIG. 3A to 3D show pictures of printing substrates as used and obtained according to the present teachings. The substrates were printed using a printing system as schematically illustrated in FIG. 2 with modifications as follows.

Briefly, the printing substrate was a web of either a synthetic paper (biaxially oriented polypropylene film (BOPP) White Matt P25 Synthetic54 Glassine Liner 60 gsm, Nirotech Adhesives & Coating Technologies, Israel) or a polypropylene plastic foil upon which a lacquer (Wessco® 3501 UV-varnish of Schmid Rhyner AG, Switzerland), was applied by flexographic printing at a linear velocity of 30 m/min to form, upon sufficient curing, a receptive layer 26. The thickness of the resulting layer was about 3.6-4.2 μm, as was determined by Laser Confocal Microscopy (Olympus, LEXT). The particles supplied to the coating station, to be dispensed upon the donor surface so as to substantially form a monolayer, were aluminum flakes (Aluminum powder 6150 supplied by Quanzhou Manfong Metal Powder Co., China, CAS No. 7429-90-5) having a roughly platelet shape with an average diameter of about 4 μm and an average thickness of about 70 nm. The particles were fed at a weight concentration of about 3 wt. % in water and sprayed upon a rolling cylindrical sponge serving as intermediate applicator 1420. The donor surface 12 was made of silicone-based polymers consisting of vinyl functionalized polydimethylsiloxane (PDMS), the addition curable formulation and preparation of which were detailed above. The printing substrate, including the patterns of the receptive layer applied in-line, was fed to the inventive printing system at ambient temperature, at a linear velocity of 30 m/min, and the force applied at the nip of the impression station was about 12 kg-f/cm.

Figure 3A:
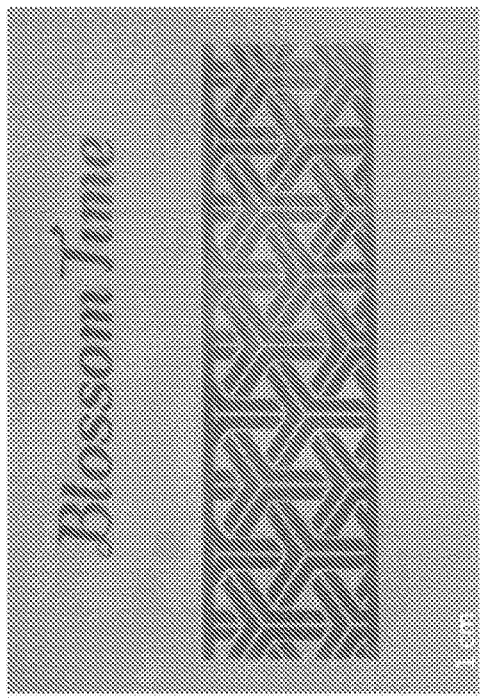
FIG. 3A is a picture on a black background paper substrate bearing an alternative pattern of a receptive layer applied by flexographic printing, the substrate being yet to be fed into an impression station according to the present disclosure.
Figure 3B:
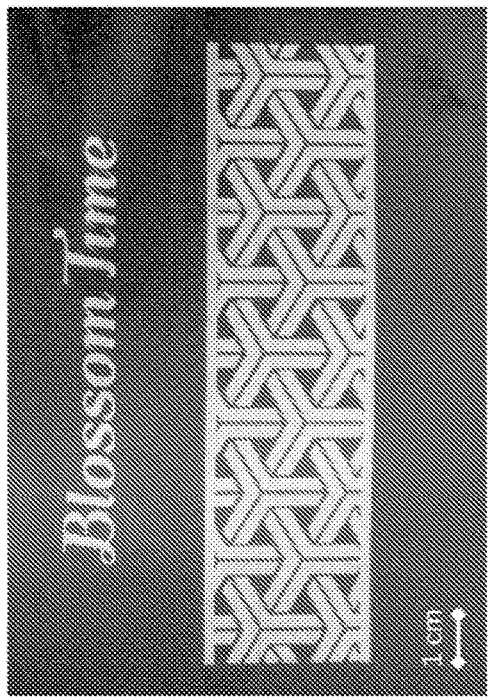
FIG. 3B is a picture of the same pattern as shown in FIG. 3A applied on a white paper substrate, on exiting the impression station.
Figure 3C:
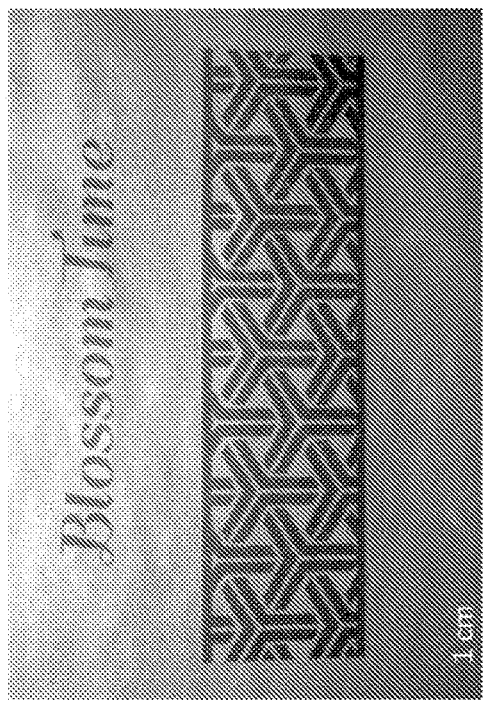
FIG. 3C is a picture of the same pattern as shown in FIG. 3A applied on a transparent plastic substrate, on exiting the impression station.
Figure 3D:
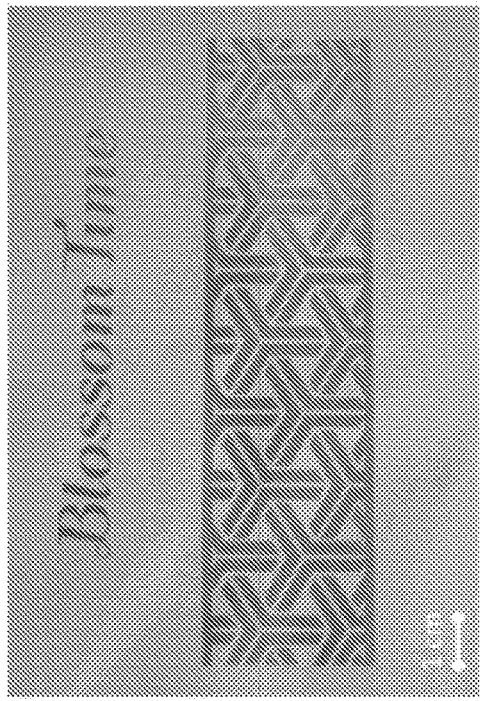
FIG. 3D is a picture of the same substrate as shown in FIG. 3A, on exiting the impression station.

FIG. 3A shows a picture of the substrate before its feeding to the impression station, the darker patterns corresponding to the receptive layer as applied by flexographic printing as explained above. For enhanced visibility of the receptive layer, the BOPP white synthetic paper substrate was pre-printed with a black background image prior to the application of the receptive layer pattern. FIG. 3B shows a picture of a white BOPP paper substrate after its exit from the impression station, following its contacting with the aluminum particles coated on the donor surface, the darker patterns corresponding to the transferred particles. FIGS. 3C and 3D shows similar post-impression pictures with contrasted metallized patterns, the substrate used in FIG. 3C being a transparent plastic foil (placed on a white background for the sake of the picture) and the substrate used in FIG. 3D being the black paper substrate of FIG. 3A.

FIGS. 4A to 4D are magnified views of a section of FIGS. 3A to 3D, respectively. As can be seen, the receptive layer patterned on the substrate suitably detached at the impression station the aluminum particles from the donor surface, so as to provide a corresponding metal printed image downstream of the impression station. Such images were not further processed in any way (e.g., no burnishing, no varnishing, etc.). It is further noted that the transfer left the corresponding regions on the donor surface 12 exposed (not shown), such regions being replenished with new particles upon completion of a subsequent cycle at the coating station.

Additional examples were printed using an alternative treating station in a printing system as schematically illustrated in FIG. 2 with modifications as follows. Briefly, the printing substrate was a photographic paper (HP, USA) upon which a lacquer (UV Screen Tactile Varnish, Cat. No. UVDO-1200-408N, Flint Group, Germany) was applied to form desired image patterns (e.g., including text and/or illustrations). The lacquer was applied by rotary silkscreen printing at a linear velocity of 20 m/min, the screen having an open surface of 36% and a mesh size of 165 μm. The layer formed on the substrate self-leveled while being transported to a curing station (e.g., for about 10 seconds or less). The lacquer coated and patterned substrate was carried out by a web substrate transport system comprising a unwinding roller supplying bare substrate, a winding roller collecting the substrate including the desired patterns of receptive layer, and intermediate rollers and support frames setting the path being travelled by the web substrate from its entry feeding side to its delivery side. The curing station, disposed downstream of the treating station (where the lacquer was applied) and upstream of the delivery winding roller, included UV lamps, so as to partially cure the UV curable lacquer. The receptive layer may preferably be cured to be sufficiently dry to the touch to permit the winding of the substrate in a manner that would not be deleterious to the receptive layer thereupon applied. Additionally, the receptive layer typically needs to remain sufficiently uncured so as to have enough affinity to the particles during printing (when contacting the particles at the impression station 18). Once sufficiently dried, in the present example by partial curing, the receptive layer formed the desired patterns for subsequent application of the particles. The receptive layer so formed had a thickness of about 52-65 μm above the surface of the substrate, as was determined by Laser Confocal Microscopy (Olympus, LEXT).

The above preparation of the substrate was performed off-line and the substrate was fed to the impression station of a printing system according to present teachings, using a standard substrate transport system, similar to that previously described. For enhanced visibility of the receptive layer, the paper substrate was pre-printed with a black background image prior to the application of the receptive layer pattern.

The printing substrate, including the patterns to become coated by particles during impression, the affinity of the selective patterns to the particles being higher than the affinity of the particles to the donor surface, was fed at a linear velocity of 0.2 m/sec, though the system may be operating at any other suitable velocity (e.g., often up to 2 m/sec, but even up to 15 m/sec or more). The force at the nip of the impression station 18, between the donor surface 12 and the impression cylinder 22 was of about 8 kg-f/cm and printing was performed at ambient temperature (circa 23° C.) without any further heating, neither at the nip nor upstream to the nip. Such operating conditions are not to be construed as limiting.

The particles (same as previously described) were supplied to the coating station at a weight concentration of about 0.1 wt. % in water to form a monolayer on a donor surface 12 made of PDMS, the addition curable formulation and preparation of which were detailed above.

Results (not shown) were similar to those depicted in FIGS. 3A, 3D, 4A and 4D. Namely the pre-printed substrate 20 before its feeding to the impression station, displayed a pattern darker than background substrate, the pattern being formed from the material due to adhere to the particles upon impression (i.e., the dried lacquer forming the receptive layer 26). The same substrate after its exit from the impression station 18, following its contacting with the outer surface of rotating drum 10 and transfer of the aluminum particles that were previously coated on the donor surface 12, displayed a metallized version of the pattern. This further demonstrates that the receptive layer patterned on the substrate suitably detached at the impression station the aluminum particles from the donor surface, so as to provide a metal printed image having a corresponding pattern downstream of the impression station.

The speed at which a substrate 20 is transported along the various stations at which it is processed and/or the distance between subsequent such stations can be used to modulate the duration of each step, also referred to as the "residence time", even though the substrate is typically in motion. For instance, the residence time at the treating station can affect the level of activation of selected regions 24 or the thickness of the applied receptive layer 26 (which depending on viscosity of the constituting substance and its method of deposition can be between a few and hundreds of micrometers). The receptive layer thickness that can be obtained by silkscreen printing application is typically between 50 μm and 500 μm, and more typically, at most 200 μm. It can be modified to provide an "embossing" look, if some distance between the top of the receptive layer (subsequently the layer of particles) and the substrate is desired. When using flexographic printing, a thinner receptive layer can be formed, having a thickness typically between 1 μm and 50 μm, and more typically, at most 15 μm.

It is believed that the residence time between the application of a substance due to form the receptive layer 26 and its setting for a subsequent step (e.g., drying, curing, contacting of particles, etc.) may affect the topography of the outer surface of the receptive layer. For instance, for glossy effects, given sufficient time the just-applied coating may level on the surface of the substrate to form a receptive layer having a substantially uniform thickness and/or having a relatively smooth outer surface. In such case, it may be preferable for the substance forming the receptive layer to have time to degas (i.e., reducing or eliminating the air bubbles that may be "entrapped" in the receptive layer) to further improve the topographical properties of the receptive layer outer surface so as to improve conformity to the particles and/or to improve the transfer of the particles to the printing substrate as a uniformly oriented mosaic of particles. The residence time at and following each station depends on the desired printing effect and on the materials being used in the process (e.g., type of substrate, receptive layer and particles). It will be appreciated that such process adjustments are known to persons skilled in the art of printing.

Magnified Views of Metallized Print-Outs

Magnified views of print-outs obtained by known technologies and by the present invention were captured by confocal microscopy, in a manner previously explained in relation with the assessment of the percentage of an area being covered by particles. The print-outs according to the present disclosure were obtained by applying a receptive layer via silkscreen printing on a printing substrate made of paper. The donor surface and aluminum particles were as previously described, the particles being at a weight concentration of 3 wt. % of the aqueous composition. The printing substrate, including the patterns of the receptive layer due to become coated by particles during impression, was fed at ambient temperature, at a linear velocity of 0.5 m/sec, and the force applied at the nip of the impression station was about 12 kg-f/cm.

Figure 5:
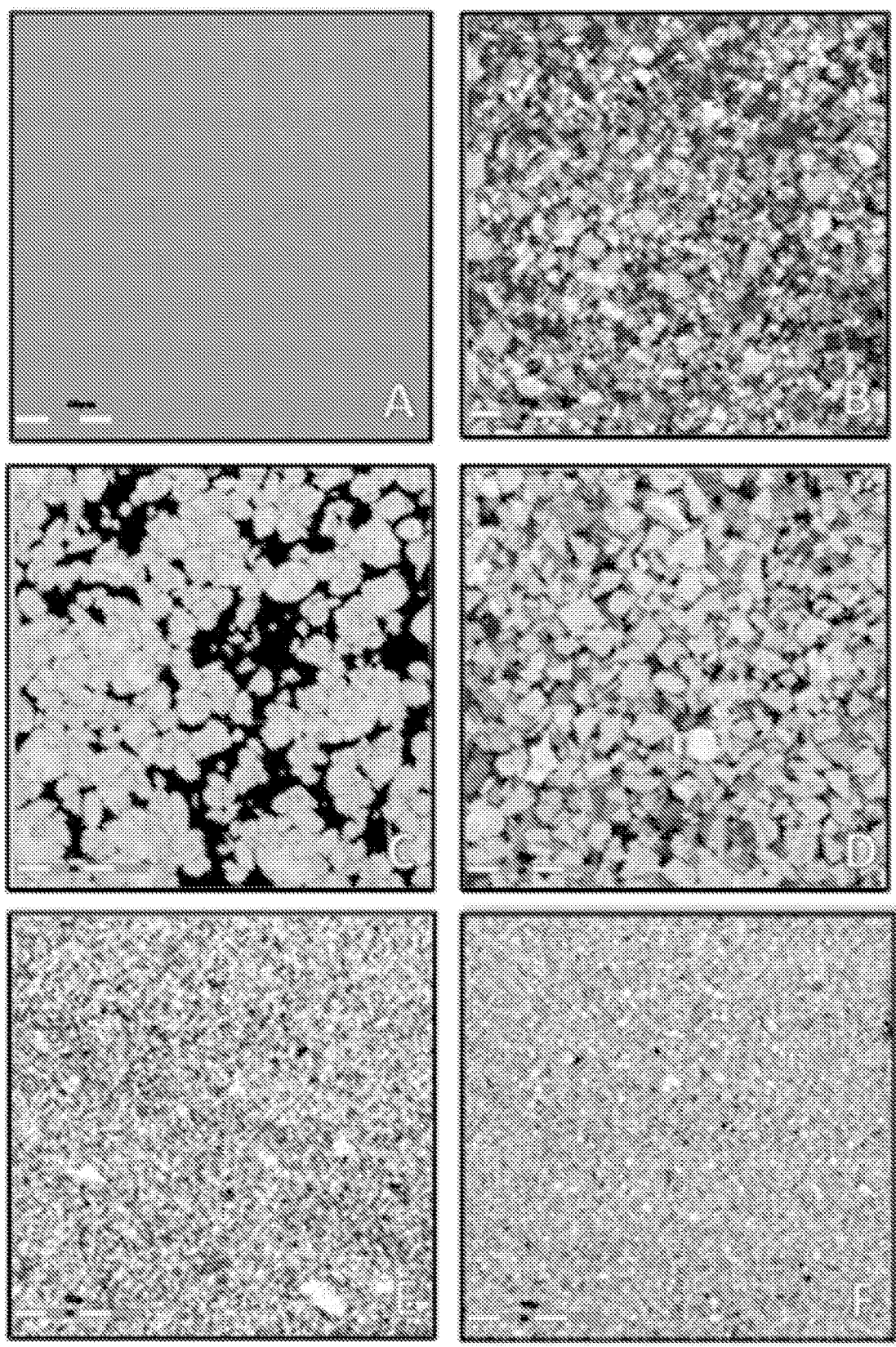
FIG. 5A is an image captured by confocal microscopy of a metallized substrate surface produced by hot foil stamping.
FIG. 5B is an image captured by confocal microscopy of a metallized substrate surface produced by offset printing.
FIG. 5C is an image captured by confocal microscopy of a metallized substrate surface produced by gravure printing.
FIG. 5D is an image captured by confocal microscopy of a metallized substrate surface produced by flexographic printing.
FIG. 5E is an image captured by confocal microscopy of a metallized substrate surface produced using a printing system and method of the present disclosure.
FIG. 5F is an image captured by confocal microscopy of a particle coated donor surface used in the printing system and method of the present disclosure.

Representative magnified micrographs, all images being with the same magnification, are shown in FIGS. 5A to 5F. Panels A to D of the figure display images showing top views of conventionally metallized print-outs as obtained by: (A) Foil stamping (hot and cold techniques resulting in a substantially similar appearance); (B) Offset printing; (C) Gravure printing; and (D) Flexography. FIG. 5E shows a similarly magnified view of a print-out according to an embodiment of the present disclosure, whereas, for comparison, panel (F) displays a monolayer of particles as formed on the donor surface of the coating station, before being transferred to a printing substrate so as to form an image as magnified in panel (E). The scale bar in the lower left angle of all images corresponds to 40 μm.

As can be seen in panel (A), foil printing, whether hot (as shown) or cold, expectedly resulted in a continuous film of metal fully covering all of the captured area. The particulate layers conventionally obtained and illustrated in panels (B) to (D), are typically uneven, at least in one of the following aspects: a) the layer comprise stacks of overlapping particles; b) the stacks are randomly distributed, possibly as a result of the limitations of each conventional printing technology; c) the thickness of the layer is irregular in particular in presence of randomly distributed stacks; and/or d) the voids between neighboring particles are randomly distributed, possibly as a result of the limitations of each conventional printing technology. It is observed that the general appearance of the conventional print-outs from which the images of panels (B) to (D) were taken can be broadly described has being hazier than the relatively more glossy print-out according to the present teachings. It is interesting to note that even the layer of particles formed on the donor surface can be relatively more glossy than conventional print outs. This further suggests that particles as conventionally applied to metallize a surface are of irregular orientations, the amount of particles possibly parallel with the surface of the substrate being insufficient to provide enough light reflection for a glossy effect. In other words, the "reflective potential" of substantially parallel particles is diminished or counterbalanced by the "scattering" effect of the particles having "non-parallel" random orientations. In contrast with such comparative technologies relying on printing of particles, the present method enables a more even orientation of the particles, the particles being predominantly parallel to the substrate, as supported by the relatively high gloss and confirmed by Atomic Force Microscopy (AFM) and FIB measurements performed on cross-sections of resulting print-outs.

The gloss of the metallized surface of printed samples can be measured by any suitable instrument. In the present examples, it was measured using a Haze-gloss Reflectometer (BYK, Cat. No. AG-4601), the illuminator projecting the incident light and the detector measuring the reflected light at angles of 20° perpendicular to the surface, the illuminator and detector thus having 40° arc distance from one another. All samples tested were printed on paper substrate, having a size of 4 cm×2 cm, the metallized samples corresponding to conventional technologies being obtained from commercial printers. For each technology, at least three randomly received samples were tested and their gloss values averaged. While it cannot be ruled out that each conventional print-metallization technology can yield higher results, the following gloss values are deemed representative and provided in support of the even orientation of particles as applied and printed according to the present teachings.

Metallized surfaces printed as herein disclosed (using a silkscreen applicator) displayed an average gloss of 426 Gloss Units (GU). For comparison, five foil-printed samples displayed an average gloss of 489 GU; four offset-printed samples had an average gloss of about 22 GU; three gravure-printed samples had an average gloss of about 63 GU; and three flexography-printed samples had an average gloss of about 55 GU. Therefore, the present technology provides with a monolayer of particles a gloss comparable to foil printing, wherein the continuous film of metal is typically substantially parallel to the substrate surface. When compared to conventional technologies relying on individual particles, it can be seen that the present disclosure enables a significantly higher gloss corresponding to approximately 6.8-fold gravure-generated gloss, about 7.7 fold flexography-generated gloss and about 19-fold offset-generated gloss.

Normalizing such gloss values to the characteristic dimensions of the particles or films involved in each process can provide an additional measure of the outstanding outcome of the present printing method. A Gloss Per Size (GPS) parameter, provided in Gloss Units per micrometer, is herein defined as the gloss of a printed sample divided by a characteristic planar dimension of the gloss generating particle or film. The gloss can be measured as above-described and the characteristic dimension of the reflective surface of relevance to each printing technology or printed sample can be measured by confocal microscopy. Typically, such dimension is the average diameter or other characteristic dimension of at least twenty distinct particles deemed representative of the population of particles sampled on the printed substrate being tested. In existing printing technologies, it is typically believed that small flakes, of less than 10 µm or 5 µm, are to be avoided, particles having a distinct metallic character requiring an equivalent diameter of about 30 µm or more. Such small flakes, especially if smaller than 5 µm, are expected to cause a significant edge scattering effect, reducing the metallic brilliance and the gloss of a printed construction. It is also believed that smaller particles may have a lower tendency than larger particle to adopt a parallel configuration of the flakes, such alignment when parallel to the surface of the printing substrate also contributing to gloss.

Such analysis was applied to the above gloss results, taking into account measured average characteristic dimensions of about 2 µm for the particles of the inventive printed constructions, as compared to about 5 µm for the particles sampled in the offset printed construction, about 10 µm for the particles sampled in the flexographic and gravure printed constructions, and an infinite number arbitrarily set to 1000 µm for the continuous layer of the foil printed constructions. The GPS calculated for the printed constructions obtained by the method herein disclosed was of about 230 GU/µm. The GPS calculated for the known technologies as assessed on the available samples did not exceed 10 GU/µm. Still it cannot be ruled out that such technologies could yield printed constructions having a higher gloss and/or being formed from particles having a smaller characteristic dimension, resulting in a GPS of up to 20 GU/µm, or up to 30 GU/µm, or up to 40 GU/µm, or even up to 50 GU/µm. Even then, it is clear that the GPS of the inventive printed constructions herein disclosed is significantly higher. It is believed that the printed constructions according to the present teachings can have, when using particles having a light reflective surface, a GPS of at least 100 GU/µm, or at least 150 GU/µm, or at least 200 GU/µm, or at least 300 GU/µm, or at least 400 GU/µm, or even at least 500 GU/µm. In some embodiments, the GPS of the instant printed constructions can be of no more than 5000 GU/µm, or of less than 4000 GU/µm, or even of less than 3000 GU/µm. It is understood that such parameter is of relevance only if gloss is a desired quality of the printed constructions. When the particles are not intended to confer gloss to the printed construction, the GPS of the resulting printed constructions can be below 100 GU/µm.

Alternative Substrate Treating

A similar printing experiment was performed in which the receptive layer was applied to a synthetic paper substrate (biaxially oriented polypropylene film (BOPP) White Matt P25 Synthetic54 Glassine Liner 60 gsm, Nirotech Adhesives & Coating Technologies, Israel) by flexographic printing. Wessco® 3501 UV-varnish of Schmid Rhyner AG, Switzerland, was applied to the substrate 20 to form, upon sufficient curing, the receptive layer 26. The thickness of the resulting layer was about 3.6-4.2 µm. The appearance of the metallized images (coated with particles of aluminum as above described) was as illustrated in FIGS. 3A to 4D and comparable (data not shown) to images obtained with silkscreen-applied receptive layers. Additionally, the layers of particles formed on such treated substrate were similar (data not shown) to those previously observed on magnified views of images obtained with silkscreen-applied receptive layers (see FIG. 5E, for reference).

The percent area coverage or optical surface coverage was assessed as previously described. Briefly, samples were similarly prepared by flexographic printing of the receptive layer on a transparent plastic foil of BOPP, images of metallized areas (i.e., formed on the layer) were captured by Optical Microscope (Olympus BX61 U-LH100-3) at a magnification of ×50 and analyzed in transmission mode. The results of three samples (each being an average of three images) were 81.3%, 84.9% and 86.4%.

Additional parameters were measured to compare a receptive layer as applied by silkscreen printing with a receptive layer as applied by flexographic printing, these two techniques being non-limiting examples of methods of treating a substrate for the present technology. The roughness of an area of the top surface of each layer (before their coating with particles) was measured using Laser Confocal Microscopy. The area roughness of the paper printing substrate upon which they were applied was measured as a reference. The substrate had an average baseline area roughness $R_a$ of 0.61 µm. When the receptive layer was applied on this substrate by silkscreen printing (layer thickness of about 52-65 µm), the area roughness $R_a$ of the top surface of the receptive layer was about 0.46 µm. When the receptive layer was applied on this substrate by flexographic printing (layer thickness of about 3.6-4.2 µm), the area roughness $R_a$ of the uppermost surface of the adhesive layer was 0.7 µm. Though not essential to the present technology, as depending on the desired printing effect, it is believed that receptive layers having a relatively low roughness (e.g., $R_a \leq 2$ µm or even $R_a \leq 1$ µm) favor a more uniform orientation of the particles, hence possibly a glossier appearance. It is also believed that a thicker receptive layer, in particular given sufficient time to properly level on the substrate and/or degas, may "absorb" and reduce part of the intrinsic roughness of the substrate, yielding an uppermost surface having a lower roughness than a relatively thin receptive layer, which follows more strictly the contour of the substrate surface. It is expected that the contribution of the thickness of the receptive layer to the visible printing effect decreases for substrates being smooth per se (e.g., printing substrates made of plastic materials).

Cross-Section of Metallized Print-Outs

FIG. 6A is a Focused Ion Beam Scanning Electron Microscope image showing a magnified view of a cross-section of a layer of particles applied on a printing substrate according to the present teachings. The metallized printing substrate was prepared as above-described, the receptive layer having been applied by silkscreen printing. A printed sample was cut from the printed substrate and attached to a microscope stub with a conductive adhesive. The stub-supported sample was coated with a 2-3 nm thin layer of platinum by sputtering. The sample so prepared was thereafter further coated for the sake of the cross section with a thicker platinum deposit using a FIB-SEM microscope (Zeiss Crossbeam 340). The cross section was performed with ionized gallium bombarding the sample at an angle of 54° from the SEM column, its image was taken at a voltage of 1.20 kV, a working distance of 2 mm, with the SEM column and an In-lens detector.

Five platelet-shaped particles captured in the image displayed in FIG. 6A, are respectfully referred to as 502a to 502e. The particles, having cross-sections that appear as white shapes, are shown on a darker film corresponding to the receptive layer upon which the particles were transferred at the impression station. The greyish overcoat above the particles in the image corresponds to the platinum protective deposit applied for the preparation of the cross-section and the present analysis. The maximum thickness of each particle was measured (e.g., using the image analyzing software of the FIB microscope) and found to be of about 47 nm (H1), 54 nm (H2), 64 nm (H3), 33 nm (H4) and 72 nm (H5), for particles 502a to 502e, respectively.

Orthogonal to the line of maximum thickness for each respective particle is the long dimension of that particle. The maximum long dimension may be measured for each particle. The maximum long dimension for particle 502c is labeled L3; the maximum long dimension for particle 502e is labeled L5.

Since particle 502a is not entirely visible within the field of view, particle 502a is excluded from the various average calculations.

The number-averaged maximum thickness of the particles is defined by:

$$H_{avg} = SUM(H1 \ldots HN)/N$$

wherein N is the number of particles within the evaluated group. In this case, particle 502a has been excluded, leaving 4 particles. Havg is thus (54+64+33+72)/4, or about 56 nm.

Lavg is calculated in a similar fashion, allowing the number-averaged aspect ratio (ASPavg) of the 4 "eligible" particles to be calculated as follows:

$$ASP_{avg} = L_{avg}/H_{avg}$$

As is evident from FIG. 6A, the particles are oriented generally or substantially parallel to the printing substrate, or to the local topography of the printing substrate. Considering that the particles are transferred from the donor surface substantially "as is", it can be assumed that the surface of the particles presently facing up once applied upon the substrate were previously facing the donor surface in the coating station. Thus, from the observation of the arrangement of the particles from above/the upper face of the particles, it can be inferred that all the particles were in direct contact with the donor surface, to one extent or another. It can be further observed that the platinum overcoat (used for sample preparation) essentially follows the contour of the particles at a minute distance, suggesting the layer of particles being substantially devoid of molecules that would hinder such proximity (such as polymeric binders). It is believed that the small gap between the particles and the platinum deposit can be attributed, at least in part, to the particle coating, in the present case, fatty acids.

FIG. 6B is a FIB-SEM image showing a magnified view of a cross-section of an offset printed metallic layer of particles, the sample being prepared substantially as previously described and the image taken at a voltage of 5 kV and a working distance of 4.2 mm. As can be seen, particles 502f to 502j have each a length of about a micrometer or more. More strikingly, they form a stack of a least four stratum of at least partially overlapping particles, 502f overlapping 502g, itself overlapping 502h, which in turn overlaps 502i. The distribution of such strata of particles, and their individual orientations, may vary amongst different samples of various art technologies, but can be broadly viewed as a 3D-array of particles within a matrix. Certain possibilities are schematically exemplified in FIGS. 7C and 7D, to be further described below.

Reverting to the SEM image of FIG. 6B, it can be observed that the gaps between such particles appear to be of the order of their thickness. For instance, the gap between 502f and 502g is about 1.5-fold to 2.5-fold the average thickness of these flakes. Reverting for comparison to FIG. 6A, the distance between 502b and 502c, which display a similar substantial overlap, is clearly less than the thickness of the particles across such "gap". It is believed that the gaps formed between particles printed according to known technologies are caused by the presence of binders in-between (and possibly surrounding) adjacent arrays of particles.

FIG. 6C is a FIB-SEM image showing a magnified view of a cross-section of a layer of particles applied on a printing substrate according to the present teachings, the layer of particles being subsequently coated with a varnish (Wessco® 3501 UV-varnish) and UV cured. The metallized printing substrate was prepared as above-described, the receptive layer having been applied by flexographic printing. A printed sample was cut from the printed substrate and attached to a microscope stub with a conductive adhesive. The stub-supported sample was coated with a 2-3 nm thin layer of platinum by sputtering. The sample so prepared was thereafter further coated for the sake of the cross section with a thicker platinum deposit using a FIB-SEM microscope (Zeiss Crossbeam 340). The cross section was performed with ionized gallium bombarding the sample at an angle of 54° from the SEM column, its image was taken at a voltage of 5.0 kV, a working distance of 4.1 mm, with the SEM column and an In-lens detector.

FIG. 6C displays a lower portion of the FIB-SEM image wherein the substrate appears as the lighter lowermost section of the image, the platinum overcoat not appearing in this section. As can be seen, the particles are substantially aligned with one another, with minute edge overlaps and short gaps, forming a light "broken line", the "dashes" corresponding to individual particles. The layer of particles so formed is essentially parallel with the surface of the substrate, or more precisely with the particle receiving surface of the receptive layer, the position of the particles in the cross section corresponding to the surface of the receptive layer. As the receptive layer and the varnish overcoat appear with a similar black shade in the present image, the layer of particles applied according to the present method can be viewed as being at the boundary between the two, the varnish overcoat not affecting the monolayer arrangement.

FIG. 6D is a FIB-SEM image showing a cross-section of a conventionally printed layer of metallic particles, the metallic ink (Super Sheen Silver 877, Kingfisher Inks, United Kingdom) being water based as the particle composition exemplified in the printing process herein disclosed. As conventional metallic inks typically contain significant amount of binder resins entrapping the particles, no varnish overcoat was applied to this printed sample. The cross section was prepared as previously described and the image taken at a voltage of 5 kV and a working distance of 4.2 mm with the same equipment as detailed for FIG. 6C.

FIG. 6D displays a portion of the FIB-SEM image wherein a dark film of binder appears between a light shaded substrate in the lowermost section of the image and the platinum overcoat applied for the sake of sample preparation in the uppermost section. The particles of the conventionally applied water based metallic ink appear as whitish strips within the darker band formed by the binder. As can be seen, the particles form a few strata with frequent substantial overlaps between particles of subsequent layers. In the present comparative sample, the particles displayed a leafing behavior, their distribution within the binder film being predominantly distal from the substrate (as schematically illustrated in FIG. 7D, to be further described below).

The various types of particle layers, which can be obtained by the printing method described hereinabove, are schematically illustrated in the cross-section along the x-y plane presented in FIGS. 7A and 7B. While particles 502, having an outer surface 504, are illustrated as having an elongated cross sectional shape (e.g., corresponding to a platelet like particle), this should not be construed as limiting. Particles 502 are positioned on top of a receptive layer 26, itself selectively applied upon the image-receiving surface 80 of a printing substrate 20, such arrangement resulting in a printed construction 500 having a monolayer 510 of particles. As previously explained, the outer surfaces 504 of particles 502 can be hydrophobic.

As used herein in the specification and in the claims section that follows, the term "monolayer", with respect to particles disposed on a substrate such as a donor surface, refers to a layer of individual particles (typically a mosaic-like layer) in which at least 85% of the particles, by number, directly contact the donor surface, and more typically, at least 90%, at least 93%, at least 95%, at least 97%, at least 98%, or at least 99% of the particles.

As used herein in the specification and in the claims section that follows, the term "monolayer", with respect to particles affixed to a substrate such as a printing substrate, refers to a layer of individual particles (typically a mosaic-like layer) in which at least 85% of the particles, by number, directly contact a receptive layer of the substrate, and more typically, at least 90%, at least 93%, at least 95%, at least 97%, at least 98%, or at least 99% of the particles. As elaborated hereinabove, when the determination of contact or non-contact is effected by means of a FIB-SEM cross-sectional image (or the like), various particles may appear to be in a state of non-contact with the receptive layer, when in fact, the particles contact the receptive layer in another plane. Consequently, for a case in which the determination of contact or non-contact is by means of a cross-sectional image such as a cross-sectional field of view, the term "monolayer" is used to refer to a layer of individual particles in which at least 70% of the particles, by number, directly contact a receptive layer of the substrate, and more typically, at least 75%, at least 80%, at least 85%, at least 90%, or at least 95% of the particles.

The monolayers of the present invention, (both monolayers with respect to particles disposed on a donor surface and with respect to particles disposed on a printing substrate), may have a surface coverage ratio of at least 20%, at least 50%, at least 60%, at least 70%, at least 80%, at least 90%, or at least 95%, or within a range of 20% to 100%, 40% to 100%, 50% to 100%, 60% to 100%, 80% to 100%, or 80% to 95%. The surface coverage ratio may be evaluated by analysis of a SEM image taken normally to the particle-bearing surface, such as the SEM images provided in FIGS. 5E and 5F. The analysis may be conducted manually or using image-analysis software, according to robust procedures well known to those of skill in the art.

As previously explained, the surfaces 504 of particles 502 are, in this particular embodiment, hydrophobic.

Referring to FIG. 7A, several particles are shown to be partially overlapping, see section A, such overlap yielding an overall particle layer thickness denoted as T. In section B, the particles are illustrated as being contiguous, whereas section C points to a gap between neighboring particles that is discernible from a direction generally orthogonal to the broad face of printing substrate 20. In section D, a particle 502' is shown as having no contact with the receptive layer, as appearing in the present x-y-cross section. However, such an overlapping particle may be positioned over the particles contacting the underneath layer such that it could conceivably contact the receptive layer at another point (not shown) along the z-direction. In section E, a particle 502" is shown as being overlapped by more than one adjacent particle.

FIG. 7B illustrates an alternative embodiment, wherein the monolayer 510 of particles is further coated with an overcoat 520. Though not shown in the present illustration, it is believed that tiny air bubbles may be entrapped at or near the interface between the receptive layer 26 (and the monolayer 510 of particles disposed thereupon) and the subsequent overcoat 520. Such phenomenon may facilitate the visualization of the boundary between such layers as can be assessed by FIB-SEM techniques or any other robust method.

It should be noted that while monolayer 510 is illustrated in FIGS. 7A and 7B as being formed on top of a receptive layer, it can mildly penetrate to be partially embedded within the layer, depending on the operating conditions and selected materials. Moreover, a layer substantially similar to 510 can be formed on the donor surface 12.

FIGS. 7C to 7E schematically illustrate cross sections of printed constructions as obtainable using known printing technologies. For avoidance of a doubt none of the illustrative figures are drawn to scale, such being the case in particular for FIGS. 9A-B and 10A-C, the comparison being therefore merely qualitative.

FIGS. 7B and 7C illustrate printed constructions prepared with inks comprising a customary mixture of particles and a binder, such inks being applied to a printing substrate 20 by printing methods of the art. Layer 530 illustrates the binder film or matrix typically formed on the substrate while using such known inks and methods. As can be seen, such techniques generally yield strata of particles, the particles in the strata more distant from the surface of the printing substrate having often no possible direct contact with the substrate. Depending on the technique, the materials used therein and the operation condition, the particles may display patterns falling broadly in two categories. FIG. 7C schematically illustrates a situation where particles 506 display a non-leafing behavior, the particles being at least partially randomly distributed and/or oriented within the binder matrix. The outer surfaces of particles 506 need not be hydrophobic. FIG. 7D schematically illustrates an alternative situation where particles 508 display a leafing behavior, the particles tending to migrate toward the interface between the binder film and air. Such a phenomenon is observed with particle 502*k* displayed in FIG. 6B. Therefore such particles of known printed constructions tend to form a gradient of distribution, their density being higher closer to the interface with the air. Leafing particles are also typically more evenly oriented within the binder matrix. FIG. 7E illustrates a representative metallized image resulting from metal foil printing. In such printed construction an adhesive layer 540 is typically transferred with a metal layer 550, so as to permit the attachment of the metal layer to the substrate 20. As previously illustrated in the context of the inventive print constructions enabled by the present disclosure, printed constructions of the prior art can be further overcoated (not shown).

Cross-sections of metallized printed matters obtainable from the deposition of conventional metal inks are expected to differ from the above-illustrated inventive printed constructions by at least one of the following: A) particles of conventional metal inks form a plurality of layers, most not in direct contact with the surface of the substrate; B) particles of conventional metal inks may be randomly oriented with respect to the surface of the substrate; C) particles of conventional metal inks are embedded or surrounded by significant amount of binder polymers; D) particles of conventional metal inks may form a gradient of concentration across the binder matrix, their density being higher as they approach the interface with the air; E) particles of conventional metal inks may form a 3D-array of particles within a matrix lacking physical boundaries between "internal layers", if any.

The inventors have found that the printed constructions according to the present teachings, even when consisting of metallic particles having an electrically conductive core or made of a conductive material, are surprisingly non-conductive, even for printed constructions having "full" area coverage. This observation, made using a four-point probe, may allow using articles bearing such printed constructions to be safely heated in microwave ovens.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used.

While this disclosure has been described in terms of certain embodiments and generally associated methods, alterations and permutations of the embodiments and methods will be apparent to those skilled in the art. The present disclosure is to be understood as not limited by the specific examples described herein.

To the extent necessary to understand or complete the disclosure of the present disclosure, all publications, patents, and patent applications mentioned herein, including in particular the priority applications of the Applicant, are expressly incorporated by reference in their entirety by reference as is fully set forth herein.

The invention claimed is:

1. A print construction comprising:
   (a) a printing substrate having an image-receiving surface;
   (b) a receptive layer, at least partially covering said image-receiving surface, and having a particle reception surface distally disposed to said image-receiving surface, said receptive layer having a thickness of at least 1000 nanometer (nm); and
   (c) a plurality of individual metal particles adhered to said particle reception surface and forming a monolayer thereon, wherein an outer surface of said metal particles is hydrophobic;
   wherein a number-averaged aspect ratio (ASPavg) of said plurality of individual metal particles is defined by:

$$ASPavg = Lavg/Havg$$

wherein Lavg is a number-averaged maximum long dimension of said plurality of individual metal particles;
   wherein Havg is a number-averaged maximum thickness of said plurality of individual metal particles;
   and wherein said plurality of individual metal particles exhibit at least one of the following structural properties:
   (A) said number-averaged maximum long dimension (Lavg) is at most 800 micrometers;
   (B) said number-averaged maximum average thickness (Havg) is at most 1200 nm;
   (C) said number-averaged aspect ratio (ASPavg) is at least 1.5:1; and
   wherein said monolayer has an optical surface coverage ratio of at least 20%.

2. The print construction of claim 1, wherein said monolayer is substantially devoid of a binder.

3. The print construction of claim 1, wherein said monolayer contains, by weight or by volume, at most 20% of a binder.

4. The print construction of claim 1, wherein said thickness of said receptive layer is at least 1.2 micrometers and at most 800 micrometers.

5. The print construction of claim 1, wherein said average maximum long dimension (Lavg) is at most 600 micrometers and at least 0.04 μm.

6. The print construction of claim 1, wherein said maximum average thickness (Havg) is at most 1000 nm.

7. The print construction of claim 1, wherein said maximum average thickness (Havg) is at least 5 nm.

8. The print construction of claim 1, wherein said average aspect ratio (ASPavg) is at least 1.5:1.

9. The print construction of claim 1, wherein said average aspect ratio (ASPavg) is at least 8:1.

10. The print construction of claim 1, wherein said average aspect ratio (ASPavg) of said plurality of individual metal particles is at most 100:1.

11. The print construction of claim 1, wherein said average aspect ratio (ASPavg) is at most 40:1.

12. The print construction of claim 1, wherein said average aspect ratio (ASPavg) is within a range of 1.5:1 to 50:1.

13. The print construction of claim 12, wherein said average aspect ratio (ASPavg) is at least 2:1.

14. The print construction of claim 1, wherein said metal particles are non-hydrophobic, and wherein a hydrophobic layer is attached to a surface of each of said metal particles, and at least partially envelops, each of said metal particles.

15. The print construction of claim 14, wherein said hydrophobic layer is an inorganic hydrophobic layer.

16. The print construction of claim 14, wherein said hydrophobic layer is an organic hydrophobic layer.

17. The print construction of claim 16, wherein said organic hydrophobic layer includes at least one of a fatty acid, an oil and an oily substance.

18. The print construction of claim 17, wherein said fatty acid, said oil, and said oily substance have a backbone having a carbon number of at least 6.

19. The print construction of claim 14, wherein said hydrophobic layer has a thickness of at most 15 nm.

20. The print construction of claim 1, wherein an organic content of said particles, by weight, is at most 15%.

21. The print construction of claim 1, wherein said monolayer-further comprises a plurality of additional particles not adhered or affixed to said particle reception surface, said plurality of additional particles amounting to at most 35% by number, of a total number of particles comprised in said monolayer.

22. The print construction of claim 1, wherein said monolayer has an optical surface coverage ratio within a range of 40% to 100%.

23. The print construction of claim 1, wherein said receptive layer has a first half ending at said particle reception surface, and a second half disposed towards and contacting said image-receiving surface, and wherein at most 5% of said plurality of individual metal particles are disposed at least partially within said second half of said receptive layer.

24. The print construction of claim 1, wherein within a field of view containing at least 5 particles of said plurality of individual metal particles, said receptive layer has a first half ending at said particle reception surface, and a second half disposed towards and contacting said image-receiving surface, and wherein at most 5% of said plurality of individual metal particles are disposed at least partially within said second half of said receptive layer.

25. The print construction of claim 1, wherein said monolayer—further comprises at least one overlapping particle that at least partially overlaps an underlying particle, and wherein a minimum distance between said overlapping particle and a surface of said underlying particle proximate to said overlapping particle is at most 25 nm.

26. The print construction of claim 1, wherein, within a field of view containing at least 5 particles of said plurality of individual metal particles, said monolayer further comprises at least one overlapping particle that at least partially overlaps a respective underlying particle, and wherein a minimum distance between each said overlapping particle and a surface of said respective underlying particle proximate to said overlapping particle is at most 25 nm.

27. The print construction of claim 1, further comprising an overcoat layer covering and sealing said monolayer, said overcoat layer having a thickness of at least 1.5 micrometers, said thickness of said overcoat layer being at most 300 micrometers.

28. The print construction of claim 27, wherein said overcoat layer has a first half extending away from said receptive layer, and a second half disposed towards and contacting said receptive layer, and wherein at most 5% of said plurality of individual metal particles are disposed at least partially within said first half of said overcoat layer.

29. The print construction of claim 27, wherein, within a field of view containing at least 5 particles of said plurality of individual metal particles, said overcoat layer has a first half extending away from said receptive layer, and a second half disposed towards and contacting said receptive layer, and wherein at most 5% of said plurality of individual metal particles are disposed at least partially within said first half of said overcoat layer.

30. The print construction of claim 27, wherein said overcoat is a transparent, translucent, or opaque coating.

31. The print construction of claim 1, wherein said receptive layer is disposed on solely a portion of said image-receiving surface.

32. The print construction of claim 31, wherein said monolayer is disposed solely on said portion of said image-receiving surface upon which said receptive layer is disposed.

33. The print construction of claim 1, wherein ASPavg is evaluated in field of view or a representative field of view containing at least 5 of said particles.

34. The print construction of claim 29, wherein said field of view contains 5 to 100 of said particles.

35. The print construction of claim 1, said printing substrate including one or more of a fibrous printing substrate and a plastic printing substrate.

36. The print construction of claim 1, said printing substrate having a thickness of at least 10 micrometers.

37. The print construction of claim 1, wherein said metal particles include at least one of aluminum, copper, iron, zinc, nickel, tin, titanium, gold, silver, and alloys thereof.

38. The print construction of claim 37, wherein said alloys include at least one of steel, bronze and brass.

39. The print construction of claim 38, wherein said metal particles include platelets having a planar dimension whose orientation is in a direction substantially parallel to the image-receiving surface.

40. The print construction of claim 39, said platelets having a light reflective surface so as to provide for a glossy image.

41. The print construction of claim 40, wherein the glossy image has a gloss per size (GPS) of at least 100 Gloss Units (GU) per average maximum long dimension (Lavg) of the particles, said dimension being in micrometers, the glossy image having a GPS of at least 150 GU/μm.

42. The print construction of claim 1, wherein the plurality of individual metal particles comprise metal cores including any one or more of aluminum, copper, iron, nickel, tin, titanium, gold, and silver, and a hydrophobic coating on the metal cores.

43. The print construction of claim 42, wherein the plurality of individual metal particles exists in a burnished state upon the particle reception surface.

* * * * *